(12) United States Patent
Hirai et al.

(10) Patent No.: US 6,545,958 B1
(45) Date of Patent: Apr. 8, 2003

(54) OPTICAL-PICKUP DEVICE AND TILT-DETECTING METHOD THEREOF

(75) Inventors: Hideaki Hirai, Kanagawa (JP); Hiroshi Koide, Kanagawa (JP); Hiroshi Akiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/384,377

(22) Filed: Aug. 27, 1999

(30) Foreign Application Priority Data

Aug. 31, 1998 (JP) .......................................... 10-245013
Dec. 21, 1998 (JP) .......................................... 10-376158

(51) Int. Cl.[7] ............................................... G11B 7/00
(52) U.S. Cl. .................................. 369/44.32; 369/53.19
(58) Field of Search ........................... 369/44.32, 94, 369/44.23, 44.37, 44.38, 53.19, 53.35

(56) References Cited

U.S. PATENT DOCUMENTS

| 5,302,834 | A | * | 4/1994 | Murao | 250/201.5 |
| 5,523,989 | A | * | 6/1996 | Ishibashi | 369/44.32 |
| 5,751,680 | A | * | 5/1998 | Ishibashi et al. | 369/44.32 |
| 5,768,232 | A | * | 6/1998 | Muramatsu et al. | 369/53.35 |
| 6,172,958 | B1 | * | 1/2001 | Mochizuki et al. | 369/44.37 |
| 6,246,648 | B1 | * | 6/2001 | Kuribayashi | 369/44.32 |
| 6,304,526 | B1 | * | 10/2001 | Nagashima et al. | 369/44.23 |
| 6,353,587 | B1 | * | 3/2002 | Hong et al. | 369/112.15 |

FOREIGN PATENT DOCUMENTS

| JP | 5-81698 | 4/1993 |
| JP | 5-242551 | 9/1993 |
| JP | 9-147395 | 6/1997 |

* cited by examiner

Primary Examiner—Thang V. Tran
(74) Attorney, Agent, or Firm—Dickstein Shapiro Morin & Oshinsky LLP

(57) ABSTRACT

An optical-pickup device includes a plurality of light sources, an objective lens for converging light from the plurality of light sources on an optical disc, and at least one light-receiving element for receiving light reflected by the optical disc. A light source of the plurality of light sources, which light source is not used for recording/reproducing, is used for detecting relative tilt between the optical disc and the objective lens.

33 Claims, 21 Drawing Sheets

OPTICAL-PICKUP DEVICE AND TILT-DETECTING METHOD THEREOF

BACKGROUND OF THE INVENTION

1. Field of the Invention

The present invention relates to an optical-pickup device and a tilt-detecting method thereof.

2. Description of the Related Art

Recently, enlargement of the storage capacity of an optical recording medium, typically, an optical disc, is strongly demanded. In order to increase the storage capacity without enlargement of the size of the optical recording medium itself, it is necessary to reduce the diameter of the light spot used in information recording/reproducing. Because the diameter of the light spot is inversely proportional to the numerical aperture NA of the objective lens, the storage capacity is proportional to the square of the NA. Therefore, increasing the NA has been attempted. For example, an optical disc (DVD: Digital Versatile Disk) for performing recording/reproducing in a condition where NA=0.6 has been developed although a conventional optical disc (CD-RW: Compact Disk ReWritable) is such that recording/reproducing is performed in a condition in which NA=0.5.

In an optical-pickup device, rays from a light source are focused, so as to form a light spot, on a recording plane of an optical disc via a transparent substrate. The shape of the light spot is distorted due to coma occurring due to a tilt of the disc substrate. The coma is proportional to the cube of NA. Because setting is made such that NA=0.6 (larger) for the DVD while setting is made such that NA=0.5 for the CD-RW, the thickness of the substrate of the DVD is ½ of that of the CD so as to reduce the influence of coma. However, because various margins (the defocus, the control error and so forth) are reduced due to increase in the storage capacity, the allowable amount of the tilt of the disc substrate is small. In order to obtain the best RF signal by causing the objective lens of the optical pickup to face the optical disc in a condition where the axis of the objective lens is perpendicular to the disc substrate although the disc substrate tilts, it is necessary to perform tilt-servo control. In order to perform the tilt-servo control, a tilt sensor which detects the tilt of the disc substrate is needed.

An example of such a tilt sensor in the related art will now be described with reference to FIG. 1. This example of the tilt sensor consists of a combination of an LED 101 provided to face the recording plane of an optical disc 100, a two-piece photodetector 102 and a subtracter 103. The LED 101 emits an LED light to the recording plane of the optical disc 100, the light reflected by the recording plane of the optical disc 100 is received by the photodetector 102, the difference between the light-reception signals from the respective two areas of the two-piece photodetector is obtained through the subtracter 103, and the thus-obtained difference signal is outputted as a tilt-error signal indicating the tilt of the optical disc 100.

However, in this example, because the tilt sensor is provided completely separately from the optical-pickup device, an extra setting space is needed, thereby, miniaturization of the entire optical-disc apparatus is obstructed, and, also, the cost of the apparatus increases. Further, it is necessary to set the LED 101 in a manner in which the optical axis of the LED 101 is accurately parallel to the optical axis of the laser light of the optical-pickup device. Therefore, the adjustment work at the time of assembly is troublesome. Furthermore, because the tilt sensor shown in FIG. 1 is located distantly from the objective lens, the accuracy in detection of the relative tilt between the optical disc 100 and the objective lens performed through the tilt sensor is not high. Furthermore, generally speaking, the tilt of the objective lens varies due to focusing and tracking. In such a case, it is not possible to detect the tilt of the objective lens accurately.

For example, Japanese Laid-Open Patent Application No. 9-147395 discloses an optical-pickup device in which these problems are solved. This optical-pickup device will now be described with reference to FIGS. 2 and 3. This optical-pickup device includes a laser diode 110 which is a light source. This device further includes a polarization beam splitter 113 which transmits the light emitted by the laser diode 110 as it is, and, thus, causes the light to travel to an optical disc 111. The polarization beam splitter 113 also reflects light reflected by the optical disc 111 through the polarization plane thereof, and, thus, causes the light to travel to a four-piece photodetector 112. The device further includes a collimator lens 114 which collimates the light, emitted by the laser diode 110. The device further includes a quarter-wave plate 115 which rotates the vibration plane of the light, which the plate 115 transmits, by a ¼ wavelength. The device further includes a hologram element 116 which disperses the parallel light, provided from the quarter-wave plate 115, into the 0-th-order light (non-diffracted light) and the first-order light. The device further includes an objective lens 117, which is formed so as to be integral with the hologram element 116, and which has a plurality of focuses so as to adapt to variation of the thickness of the substrate of the optical disc. A multiple-focus lens 118 is formed as a result of combining the objective lens 117 and the hologram element 116. The device further includes a multiple lens 119, acting as astigmatism means, provided in front of the photodetector 112. The multiple-focus lens 118 disperses incident light into a plurality of beams of light. A beam L0 (or L1) of the plurality of beams of light, which beam is focused on the recording plane of the optical disc 111, is reflected thereby, and the thus-obtained light is received by the photodetector 112 through the multiple lens 119. The thus-received light is used as a signal for reproducing information recorded on the optical disc 111.

In addition to this basic arrangement, two light-receiving elements 121 and 122 are provided on both sides of the photodetector 112, in a direction corresponding to the radial direction of the optical disc 111, as shown in FIG. 3. The difference between the output signals of these light-receiving elements 121 and 122 is obtained through a subtracter 123. The thus-obtained difference is used as a tilt-error signal.

However, in the case of the tilt-detecting method shown in FIGS. 2 and 3, because the laser light emitted by the laser diode 110 is modulated at the time of a recording operation, it is not possible to obtain a stable tilt-error signal. Further, the extra light-receiving elements 121 and 122 are needed. Therefore, the arrangement is complicated, and, also, cost reduction and miniaturization of the device are obstructed.

Further, when an optical-axis deviation exists between the ideal optical axis and the optical axis of the objective lens at the time of tracking, the offset due to the optical-axis deviation is included in the tilt signal. However, it is not possible to determine whether this offset develops due to the optical-axis deviation or the tilt. Therefore, in a case where an optical system is such that the optical-axis deviation is large, a countermeasure such as to provide a member for detecting the optical-axis deviation is needed.

SUMMARY OF THE INVENTION

An object of the present invention is to provide an optical-pickup device and a tilt-detecting method in which, basically, it is not necessary to provide an extra member for detecting the tilt, and, also, the tilt can be always detected even during a recording/reproducing operation.

Another object of the present invention is to provide an optical-pickup device in which the tilt can be accurately detected without being affected by the offset due to the optical-axis deviation.

An optical-pickup device according to the present invention, comprises:

a plurality of light sources;

an objective lens for converging light from the plurality of light sources on an optical disc; and at least one light-receiving element for receiving light reflected by the optical disc, wherein a light source of the plurality of light sources, which light source is one not used for recording/reproducing, is used for detecting relative tilt between the optical disc and the objective lens.

In this arrangement, in the optical-pickup device having the plurality of light sources, at the time of recording/reproducing, one of the light sources, which one is one not used for the recording/reproducing, is used for the tilt detection. As a result, the objective lens which is used for recording/reproducing can also be used for the tilt detection in common. Therefore, it is not necessary to additionally provide a special tilt-detecting member, and, also, it is possible to accurately perform the tilt detection. Furthermore, it is possible to perform the tilt detection in real time even during a recording/reproducing operation. In particular, when one of the light sources is used and a recording/reproducing operation is performed, the light emitted by another one of the light sources does not focus on the optical disc, that is, the emitted light is in a defocus condition. However, a focusing operation is always performed on the side of the one of the light sources used for recording/reproducing. As a result, the focus-deviation amount on the side of the one of the light sources used for the tilt detection is always constant. Therefore, the defocus condition on the side of the one of the light sources used for the tilt detection is in a stable defocus condition. Accordingly, it is possible to perform stable, accurate tilt detection even in the defocus condition.

The optical-pickup device can perform recording/reproducing on any one of a plurality of types of optical discs, the thicknesses of substrates of the plurality of types of optical discs being different from each other.

Therefore, it is possible to perform the tilt detection for the plurality of types of optical discs, the thicknesses of substrates of which are different from each other.

An optical-pickup device according to another aspect of the present invention, comprises:

an objective lens for converging light, emitted from a light source which is used for tilt detection, to an optical disc; and an objective-lens actuator such that no optical-axis deviation develops between the ideal optical axis and the optical axis of the objective lens at a time of tracking when said object-lens actuator is used.

In this arrangement, the signal developing due to optical-axis deviation is not included in the tilt signal. Therefore, it is not necessary to provide an optical-axis deviation detecting member, and it is possible to perform the tilt detection accurately. In this arrangement, the light source used for the tilt detection may be the light source which is also for recording/reproducing in common, or may be any one of the plurality of light sources as described above.

The at least one light-receiving element may comprise a plurality of light-receiving elements for the plurality of light sources, respectively; and each light-receiving element is used for detecting an information signal and a servo signal based on the light reflected by the optical disc, and the same light-receiving element is also used for detecting a tilt signal based on the light reflected by the optical disc.

In this arrangement, it is not necessary to additionally provide a special light-receiving element for the tilt detection. Thereby, it is possible to perform miniaturization of the device, and, also, to reduce the cost of the device.

The at least one light-receiving element may comprise a single light-receiving element for the plurality of light sources; and the light-receiving element is used for detecting an information signal and a servo signal based on the light reflected by the optical disc, and the same light-receiving element is also used for detecting a tilt signal based on the light reflected by the optical disc.

In this arrangement, the single light-receiving element is used for the plurality of light sources in common. Thereby, it is possible to perform further miniaturization of the device, and, also, to further reduce the cost of the device.

A tilt-detecting method according to the present invention, comprises the steps of:

a) using any one of a plurality of light sources as a light source for detecting a relative tilt between an optical disc and an objective lens; and b) causing, at a time of tilt detection, the light source to emit light obtained as a result of light intensity modulation with a waveform including an alternating-current component, the basic frequency of the waveform being fixed.

In this method, even in an arrangement in which a single light-receiving element receives light emitted by the plurality of light sources and reflected by the optical disc, it is not necessary to additionally provide a special light-receiving element for the tilt detection because it is possible to use the single light-receiving element for recording/reproducing and also for the tilt detection in common. Accordingly, it is possible to perform the tilt detection through the miniature, inexpensive arrangement.

The above-mentioned waveform may approximate a rectangular wave.

The waveform may be selected so that frequency components of the waveform are out of a control band so that a focusing-and-tracking servo system does not respond to the frequency components, and the frequency components include none or a few of the frequency components of a recording signal, have or little influence on increase of jitter in a reproduced signal, or include none or a few of frequency components of various signals generated based on information formed on the optical disc.

In this method, the intensity-modulation waveform is selected so that the thus-intensity-modulated laser light for the tilt detection does not adversely affect the servo control nor the recording/reproducing operation. As a result, it is possible to perform the tilt-detecting operation in real time.

A signal which includes no direct-current component may be used for a tilt-detecting calculation.

At a beginning of the tilt detection, the level of the light emitted by the light source for the tilt detection may be caused to rise in a manner in which the intensity of the emitted light increases gradually, and, also, the amplitude increases gradually so as to become a fixed amplitude, and, at an end of the tilt detection, the level of the laser light emitted by the light source for the tilt detection may be caused to decay in a manner in which the intensity of the emitted light decreases gradually, and, also, the amplitude decreases gradually from the fixed amplitude.

In this method, even in a condition in which a plurality of light sources are adjacently located, such as a case where a plurality of light source are contained in one package, it is possible to prevent the light sources from being deteriorated.

A tilt-detecting operation may be performed intermittently.

In this method, even in a condition in which a plurality of light sources are adjacently located, such as a case where a plurality of light source are contained in one package, it is possible to reduce the influence (noise) on the servo signal and reproduced signal, which influence (noise) occurs at the time of the rising and the time of decaying of the tilt-detecting signal.

In an operation mode in which a tilt-detecting operation cannot be performed, tilt correction may performed using tilt data which was detected in a tilt-detecting operation performed before the beginning of this operation mode.

In this method, in an operation mode in which a tilt-detecting operation cannot be performed, such as a seeking-operation mode, because influence developing due to change in tilt is small, it is possible to perform a proper tilt correction using tilt data detected when the optical disc was loaded in the optical device.

An offset of a focus-error signal or a tracking-error signal generated due to the tilt-detection light at the time of tilt detection may be removed based on detected tilt data.

In this method, the offset developing due to the tilt-detecting light and included in the focus-error signal or tracking-error signal obtained based on the light reflected by the recording plane of the optical disc is removed based on the detected tilt data. Thereby, it is possible to obtain the correct focus-error signal or tracking-error signal, and to perform proper focusing or tracking control.

An S-shape tracking-error or focus-error signal may be detected in a condition in which the light source for the tilt detection is in its turned-off state, then, the S-shape tracking-error or focus-error signal may be detected in a condition in which the light source for the tilt detection is driven so that the light source emits the light obtained as a result of intensity modulation with the waveform, the difference (a–b) between the S-shape tracking-error or focus-error signals detected in these different conditions may be calculated, the level 'c' of the mean direct-current signal of the tilt-detection signal may be detected, the mean direct-current signal may be inputted to a gain-adjustment circuit, the gain of which is set to be (a–b)/c, and the offset component of the focus-error or tracking-error signal may be removed using the output of the gain-adjustment circuit, the output of which is caused to be equal to the difference (a–b).

An optical-pickup device, according to another aspect of the present invention, which can record information on any one of a plurality of types of optical recording media, the thicknesses of the substrates of the plurality of types of optical recording media being different from each other, and wavelengths used for performing recording/reproducing on the plurality of types of optical recording media being different from each other, and can reproduce information recorded on the one of the plurality of types of optical recording media, the device comprising:

a semiconductor laser which emits laser light of a first wavelength;

a wavelength-converting element which produces-laser light of a second wavelength which is half of the first wavelength;

a converging optical system which can focus the laser light of a selected wavelength on the information recording plane of the one of the plurality of types of optical recording media, the selected wavelength being one of the first and second wavelengths corresponding to the one of the plurality of types of optical recording media;

a light-path splitting element which splits the light path of the laser light of the first wavelength and the laser light of the second wavelength into separate light paths for the respective first and second wavelengths;

a first detector which detects the reflected laser light of the first wavelength; and a second detector which detects the reflected laser light of the second wavelength, wherein either one of the laser light of the first wavelength and the laser light of the second wavelength is used for performing recording/reproducing of information on the one of the plurality of types of optical recording media, and, also, the other one is used for tilt detection for detecting the relative tilt between the information recording plane of the one of the plurality of type of optical recording media and an objective lens of the converging optical system.

In this arrangement, in the optical-pickup device which can perform recording/reproducing on any one of the optical recording medium for which the laser light of the first wavelength is used and the optical recording medium for which the laser light of the second wavelength is used, either one of the laser light of the first wavelength and the laser light of the second wavelength is used for performing recording/reproducing of information on the one of the plurality of types of optical recording media, and, also, the other one is used for tilt detection for detecting the relative tilt between the information recording plane of the one of the plurality of types of optical recording media and an objective lens of the converging optical system. Therefore, stable, real-time tilt detection (tilt detection using the laser light which is not focused on the optical recording medium while the other laser light is focused on the optical recording medium) can be performed using the laser light which is not used for recording/reproducing. Further, the laser light of the first wavelength and the laser light of the second waveform, reflected by the optical recording medium, are stably detected by the different detectors, respectively. Furthermore, because the arrangement is not complicated, it is possible to miniaturize and reduce the cost of the optical-pickup device. Furthermore, because the objective lens which is used for recording/reproducing is also used for the tilt detection in common, it is possible to accurately perform the tilt detection without additionally providing a special tilt-detecting member.

The light-path splitting element may be provided in front of each of the first and second detectors.

In this arrangement, as a result of providing the light-path splitting element in proximity to the detectors, it is possible to detect the laser light of the first wavelength and the laser light of the second waveform, reflected by the optical recording medium, using the stable signals.

The converging optical system may comprise a first objective lens for focusing the laser light of the first wavelength on the corresponding one of the plurality of types of optical recording media and a second objective lens for focusing the laser light of the second wavelength on the corresponding one of the plurality of types of optical recording media;

one of the first and second objective lenses may be selected to be used for performing recording/reproducing of information on one of the plurality of types of optical recording media, the one of the plurality of types of optical recording media being one on which recording/reproducing of information is currently performed, the one of the first and second objective lenses being one corresponding to the one of the plurality of types of optical recording media; and the one of the first and second objective lens may be inserted into the light path of the laser light.

In this arrangement, the objective lenses are provided for the two wavelengths, and the proper one is selected therefrom for the type of the optical recording medium. Thereby, it is possible to detect the stable signals by preventing development of an aberration due to the difference in the thickness of the substrate of the optical recording medium and so on, and to detect the laser light of the first wavelength and the laser light of the second waveform, reflected by the optical recording medium, using the stable signals through the different detectors, respectively.

The converging optical system may comprise the objective lens for focusing the laser light of the second wavelength on the corresponding one of the plurality of types of optical recording media and a numerical-aperture limiting aperture for limiting the numerical aperture of the objective lens for the laser light of the first wavelength so as to focus the laser light of the first wavelength on the corresponding one of the plurality of types of optical recording media; and the numerical-aperture limiting aperture may be provided in the light path of the laser light in front of the objective lens.

In this arrangement, the objective lens and numerical-aperture limiting aperture are provided for the two wavelengths. Thereby, it is possible to detect the stable signals by preventing development of the aberration due to the difference in the thickness of the substrate of the optical recording medium and so on, to prevent the arrangement from being complicated due to addition of a lens, and to detect the laser light of the first wavelength and the laser light of the second waveform, reflected by the optical recording medium, using the stable signals, through the different detectors, respectively.

An optical-pickup device, according to another aspect of the present invention, which can record information on any one of a plurality of types of optical recording media, the thicknesses of the substrates of the plurality of types of optical recording media being different from each other, and wavelengths used for performing recording/reproducing on the plurality of types of optical recording media being different from each other, and can reproduce information recorded on the one of the plurality of types of optical recording media, the device comprising:

a first semiconductor laser which emits laser light of a first wavelength;

a wavelength-converting element which produces laser light of a second wavelength which is half of the first wavelength;

a second semiconductor laser which emits laser light of a third wavelength which is different from the first wavelength and also is different from the second wavelength;

a light-path synthesis element which causes the light path of the laser light of the third wavelength to become the same as the light path of the laser light of the first wavelength and the laser light of the second laser light;

a converging optical system which can focus the laser light of a selected wavelength on an information recording plane of the one of the plurality of types of optical recording media, the selected wavelength being one of the first and second wavelengths corresponding to the one of the plurality of types of optical recording media;

a detector which can detect at least any of the reflected laser light of the first wavelength, the reflected laser light of the second wavelength and the reflected laser light of the third wavelength, wherein any one of the laser light of the first wavelength, the laser light of the second wavelength and the laser light of the third wavelength is used for performing recording/reproducing of information on the one of the plurality of types of optical recording media, and, also at least one of the other two of the laser light of the first wavelength, the laser light of the second wavelength and the laser light of the third wavelength is used for tilt detection for detecting a relative tilt between the information recording plane of the one of the plurality of types of optical recording media and an objective lens of the converging optical system.

In this arrangement, in the optical-pickup device which can perform recording/reproducing on any one of the optical recording medium for which the laser light of the first wavelength is used, the optical recording medium for which the laser light of the second wavelength is used and the optical recording medium for which the laser light of the third wavelength is used, any one of the laser light of the first wavelength, the laser light of the second wavelength and the laser light of the third wavelength is used for performing recording/reproducing of information on the one of the plurality of type of optical recording media, and, also, another one is used for tilt detection for detecting the relative tilt between the information recording plane of the one of the plurality of types of optical recording media and an objective lens of the converging optical system. Therefore, stable, real-time tilt detection (tilt detection using the laser light which is not focused on the optical recording medium while the other laser light is focused on the optical recording medium) can be performed using the laser light which is not used for recording/reproducing. Further, because at least any of the laser light of the first wavelength, the laser light of the second wavelength and the laser light of the third wavelength, reflected by the optical recording medium, are detected by the same single detector, it is possible to miniaturize and to reduce the cost of the optical-pickup device. Furthermore, because the objective lens which is used for recording/reproducing is also used for the tilt detection in common, it is possible to accurately perform the tilt detection without additionally providing a special tilt-detecting member.

The optical-pickup device may further comprise at least two wavelength-selecting elements which selectively transmit a first combination of two of the laser light of the first wavelength, the laser light of the second wavelength and the laser light of the third wavelength and a second combination of two of the laser light of the first wavelength, the laser light of the second wavelength and the laser light of the third wavelength, respectively.

In this arrangement, by providing the at least two wavelength-selecting elements which selectively transmit a first combination of two of the laser light of the first wavelength, the laser light of the second wavelength and the laser light of the third wavelength and a second combination of two of the laser light of the first wavelength, the laser light of the second wavelength and the laser light of the third wavelength, respectively, it is possible to prevent the laser light of the wavelength which is not used for the recording/reproducing nor the tilt detection from being incident on the detector.

An optical-pickup device, according to another aspect of the present invention, which can record information on any one of a plurality of types of optical recording media, the thicknesses of the substrates of the plurality of types of optical recording media being different from each other, and wavelengths used for performing recording/reproducing on the plurality of types of optical recording media being different from each other, and can reproduce information recorded on the one of the plurality of types of optical recording media, the device comprising:

a first semiconductor laser which emits laser light of a first wavelength;

a wavelength-converting element which produces laser light of a second wavelength which is half of the first wavelength;

a second semiconductor laser which emits laser light of a third wavelength which is different from the first wavelength and also is different from the second wavelength;

a light-path synthesis element which causes the light path of the laser light of the third wavelength to become the same as the light path of the laser light of the first wavelength and the laser light of the second wavelength;

a converging optical system which can focus the laser light of a selected wavelength on an information recording plane of the one of the plurality of types of optical recording media, the selected wavelength being one of the first and second wavelengths corresponding to the one of the plurality of types of optical recording media;

a light-path splitting element which splits the light path of the laser light of the first wavelength, the laser light of the second wavelength and the laser light of the third wavelength into separate light paths for the respective first, second and third wavelengths;

a first detector which detects the reflected laser light of the first wavelength;

a second detector which detects the reflected laser light of the second wavelength; and a third detector which detects the reflected laser light of the third wavelength, wherein any one of the laser light of the first wavelength, the laser light of the second wavelength and the laser light of the third wavelength is used for performing recording/reproducing of information on the one of the plurality of types of optical recording media, and, also, at least one of the other two of the laser light of the first wavelength, the laser light of the second wavelength and the laser light of the third wavelength is used for tilt detection for detecting a relative tilt between the information recording plane of the one of the plurality of types of optical recording media and an objective lens of the converging optical system.

In this arrangement, in the optical-pickup device which can perform recording/reproducing on any one of the optical recording medium for which the laser light of the first wavelength is used, the optical recording medium for which the laser light of the second wavelength is used and the optical recording medium for which the laser light of the third wavelength is used, any one of the laser light of the first wavelength, the laser light of the second wavelength and the laser light of the third wavelength is used for performing recording/reproducing of information on the one of the plurality of types of optical recording media, and, also, the other one is used for tilt detection for detecting the relative tilt between the information recording plane of the one of the plurality of types of optical recording media and an objective lens of the converging optical system. Therefore, stable, real-time tilt detection (tilt detection using the laser light which is not focused on the optical recording medium while the other laser light is focused on the optical recording medium) can be performed using the laser light which is not used for recording/reproducing. Further, the laser light of the first wavelength, the laser light of the second waveform and the laser light of the third wavelength, reflected by the optical recording medium, are stably detected by the different detectors, respectively. Furthermore, because the arrangement is not complicated, it is possible to miniaturize and reduce the cost of the optical-pickup device. Furthermore, because the objective lens which is used for recording/reproducing is also used for the tilt detection in common, it is possible to accurately perform the tilt detection without additionally providing a special tilt-detecting member.

The light-path splitting element may be provided in front of each of the first, second and third detectors.

In this arrangement, as a result of providing the light-path splitting element in proximity to the detectors, it is possible to detect the laser light of the first wavelength, the laser light of the second wavelength and laser light of the third wavelength, reflected by the optical recording medium, using the stable signals.

The converging optical system may comprise a first objective lens for focusing the laser light of the first wavelength on the corresponding one of the plurality of types of optical recording media, a second objective lens for focusing the laser light of the second wavelength on the corresponding one of the plurality of types of optical recording media and a third objective lens for focusing the laser light of the third wavelength on the corresponding one of the plurality of types of optical recording media;

one of the first, second and third objective lenses may be selected to be used for performing recording/reproducing of information on one of the plurality of types of optical recording media, the one of the plurality of types of optical recording media being one on which recording/reproducing of information is currently performed, the one of the first, second and third objective lens being one corresponding to the one of the plurality of types of optical recording media; and the one of the first, second and third objective lens may be inserted into the light path of the laser light.

In this arrangement, the objective lenses are provided for the three wavelengths, respectively, and the proper one is selected therefrom for the type of the optical recording medium. Thereby, it is possible to detect the stable signals by preventing development of the aberration developing due to the difference in the thickness of the substrate of the optical recording medium and so on, and to detect the laser light of the first wavelength, the laser light of the second wavelength and the laser light of the third wavelength, reflected by the optical recording medium, using the stable signals, through the different detectors, respectively.

The converging optical system may comprise the objective lens for focusing the laser light of the second wavelength on the corresponding one of the plurality of types of optical recording media and a numerical-aperture limiting aperture for limiting the numerical aperture of the objective lens for the laser light of the first wavelength and the laser light of the third wavelength so as to focus the laser light of the first wavelength on the corresponding one of the plurality of types of optical recording media and focus the laser light of the third wavelength on the corresponding one of the plurality of types of optical recording media; and the numerical-aperture limiting aperture may be provided in the light path of the laser light in front of the objective lens.

In this arrangement, the objective lens and numerical-aperture limiting aperture are provided for the three wavelengths. Thereby, it is possible to detect the stable signals by preventing development of the aberration developing due to the difference in the thickness of the substrate of the optical recording medium and so on, to prevent the arrangement from being complicated due to addition of a lens, and to detect the laser light of the first wavelength and the laser light of the second wavelength, reflected by the optical recording medium, using the stable signals, through the different detectors, respectively.

When recording/reproducing is performed on one of the plurality of types of optical recording media, the one of the plurality of types of optical recording media being one corresponding to the laser light of the first wavelength, the wavelength-converting element may not cause the phases of the components of the laser light of the second wavelength to match with each other, so that the wavelength-converting element does not emit the laser light of the second wavelength.

In this arrangement, when recording/reproducing is performed on the one of the plurality of types of optical recording media, the one of the plurality of types of optical recording media being one corresponding to the laser light of the first wavelength, only the laser light of the first wavelength is caused to be emitted from the wavelength-converting element. Thereby, at this time, it is possible to use the laser light of the first wavelength at high efficiency. In a case where the wavelength converting element is a second-harmonic generating element in which a quasi phase matching is used, when the quasi phase matching is not performed (when blue laser light is not emitted), it is possible to provide a sufficient amount of infrared laser light. Thereby, it is possible to improve the light use efficiency at the time of recording/reproducing performed on the CD.

The light-path splitting element may comprise a dichroic mirror.

In this arrangement, because the arrangement of the optical-pickup device is not complicated, it is possible to miniaturize and to reduce the cost of the optical-pickup device.

The light-path splitting element may comprise a wavelength selecting hologram.

In this arrangement, because the arrangement of the optical-pickup device is not complicated, it is possible to miniaturize and to reduce the cost of the optical-pickup device.

Other objects and further features of the present invention will become more apparent from the following detailed description when read in conjunction with the accompanying drawings.

DETAILED DESCRIPTION OF THE PREFERRED EMBODIMENTS

A first embodiment of the present invention will now be described with reference to FIGS. 4, 5A, 5B, 6A and 6B. First, a background art of the first embodiment will now be described. As described above, recently, with enlargement of the storage capacity of an optical disc, the wavelength of the light emitted by the light source used in reproducing/recording is reduced. For example, the wavelength of 650 nm is used for DVD-ROM, and the wavelength of 635 nm is used for DVD-R. On one hand, in the related art, there is an optical disc, for which a special wavelength should be used in reproducing/recording. For example, the wavelength of 785 nm should be used for the CD-R. For the present, the CD and the DVD are used together. In such a situation, in the condition where a special wavelength should be used for each type of an optical disc, two light sources having different wavelengths, respectively, are used together in order to perform reproducing/recording on both the CD and DVD in a single disc device.

Figure 1:
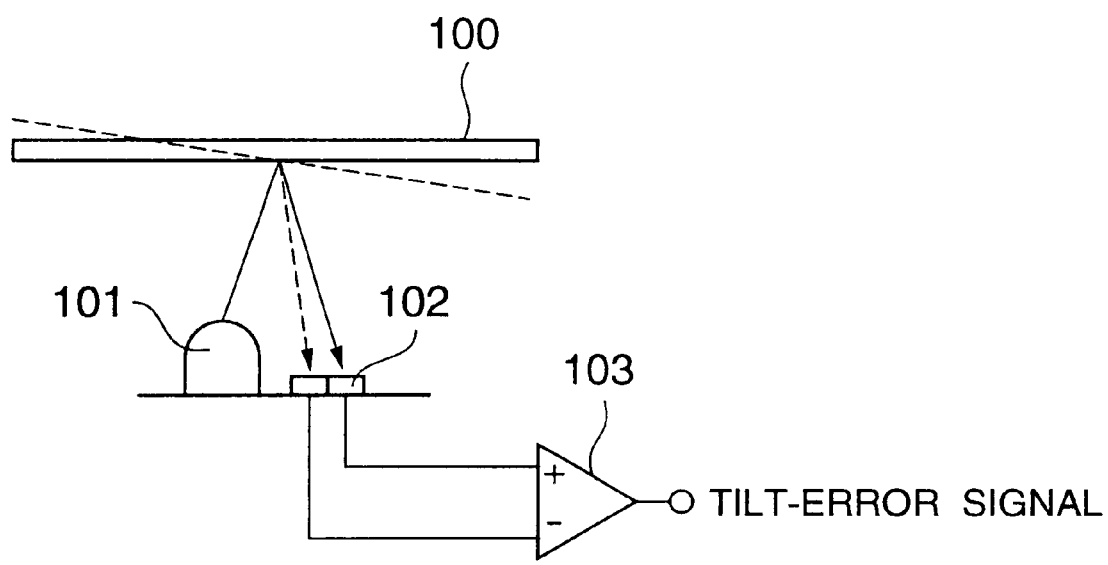
FIG. 1 shows a general arrangement showing a tilt sensor in the related art.
Figure 2:
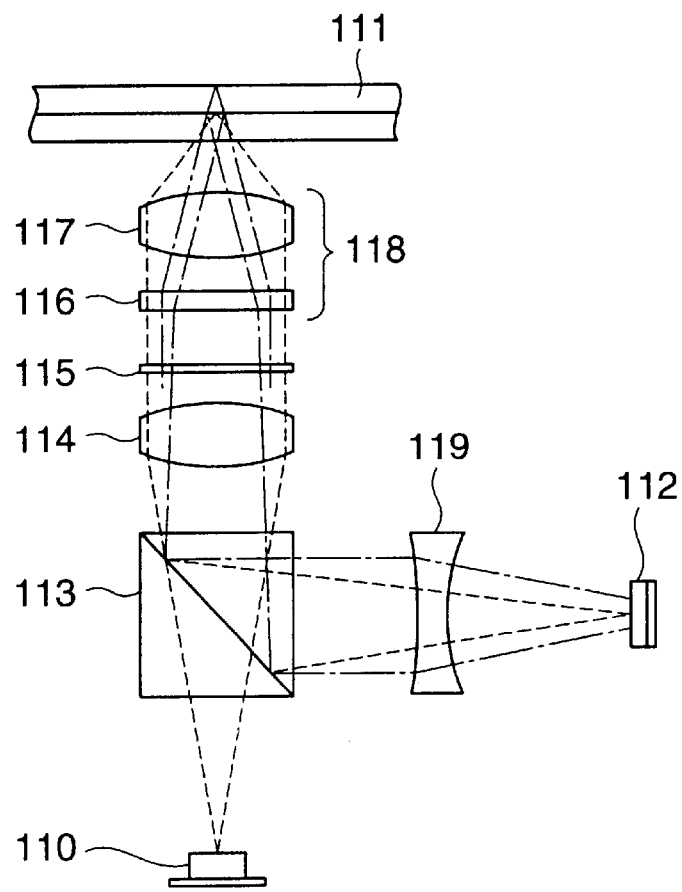
FIG. 2 shows an optical-system arrangement showing another tilt sensor in the related art.
Figure 3:
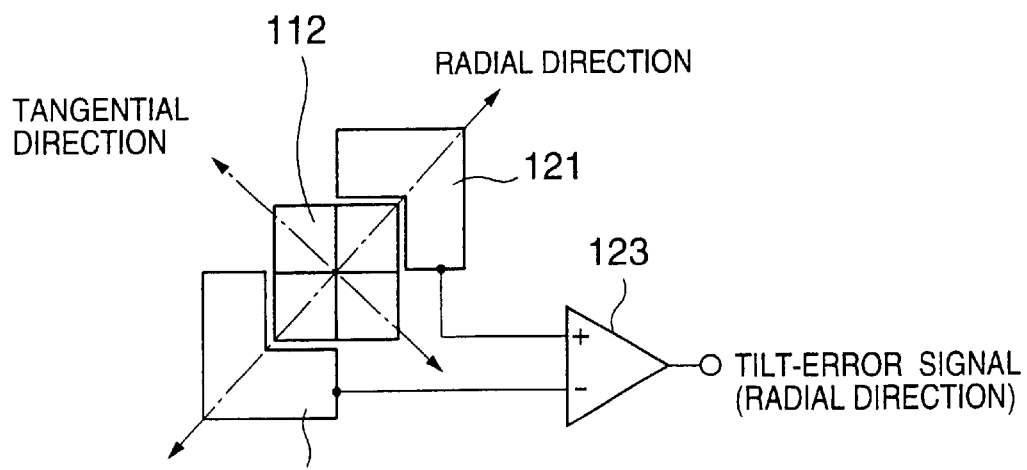
FIG. 3 shows a plan view showing a light-receiving element of the optical system shown in FIG. 2.
Figure 4:
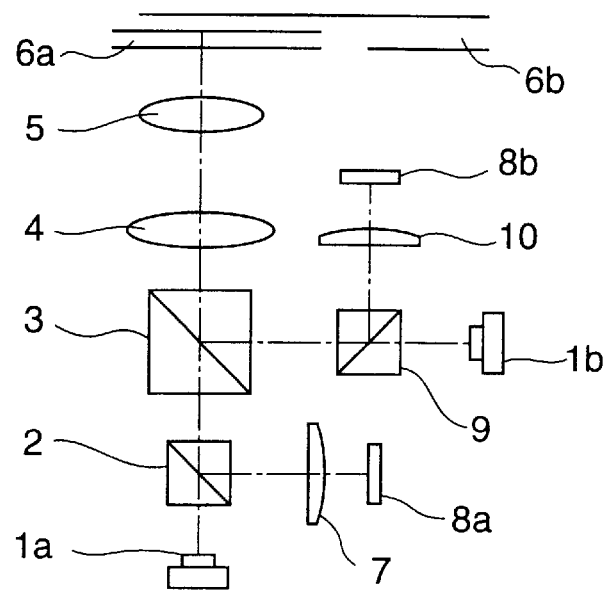
FIG. 4 shows an optical-system arrangement showing a first embodiment of the present invention.

FIG. 4 is an optical-system-arrangement drawing showing an example of an optical pickup in the first embodiment, which pickup has such two light sources at once. Generally, the optical pickup shown in FIG. 3 includes a semiconductor laser 1a which is a light source emitting a laser light of the wavelength of 635 nm, and a semiconductor laser 1b which is a light source emitting a laser light of the wavelength of 780 nm. The light emitted by the semiconductor laser 1a is transmitted by a beam splitter 2, is transmitted by a two-wavelength-synthesis prism 3, is caused to become an approximately parallel light by a coupling lens 4, then, is focused by an objective lens on the recording plane of a DVD 6a as a minute spot, and is used for information recording/reproducing. The light reflected by the DVD 6a is caused to become an approximately parallel light by the objective lens 5 again, is caused to become a converging light by the coupling lens 4, is transmitted by the two-wavelength-synthesis prism 3, then, is reflected by the polarization plane of the beam splitter 2, is given astigmatism by a cylindrical lens 7, and is incident on a two-piece light-receiving element 8a which is used for detecting an information signal, and a servo signal of tracking error and focus error.

On the other hand, the light emitted by the semiconductor laser 1b is transmitted by a beam splitter 9, is reflected by the two-wavelength-synthesis prism 3, then, passes through the optical path the same as that of the laser light emitted by the semiconductor laser 1a of the wavelength of 635 nm, is focused by the objective lens 5 on the recording plane of a CD 6b as a minute spot, and is used for information recording/reproducing. The light reflected by the CD 6b is caused to become an approximately parallel light by the objective lens 5 again, is caused to become a converging light by the coupling lens 4, is reflected by the two-wavelength-synthesis prism 3, then, is reflected by the polarization plane of the beam splitter 9, is given astigmatism by a cylindrical lens 10, and is incident on a two-piece light-receiving element 8b for detecting the information signal, and the servo signal of tracking error and focus error.

The DVD 6a and the CD 6b have different thicknesses of the substrates thereof corresponding to the different wavelengths of the semiconductor lasers 1a and 1b, respectively.

In the first embodiment, having the above-described basic arrangement, any one of the plurality of semiconductor lasers 1a and 1b is used as a light source for detecting the relative tilt between the optical disc 6 (6a or 6b) and the objective lens 5.

The principle of the tilt detection will now be described with reference to FIGS. 5A, 5B, 6A and 6B. Each of these FIGS. 5A, 5B, 6A and 6B is a figure (for the light-receiving element, the side-elevational view and the plan view are shown together) for illustrating the principle. Therefore, an optically strict ray path is not shown, and showing of optical components which are provided on the way to the light-receiving element 8 (8a or 8b) is omitted.

Figure 5A:
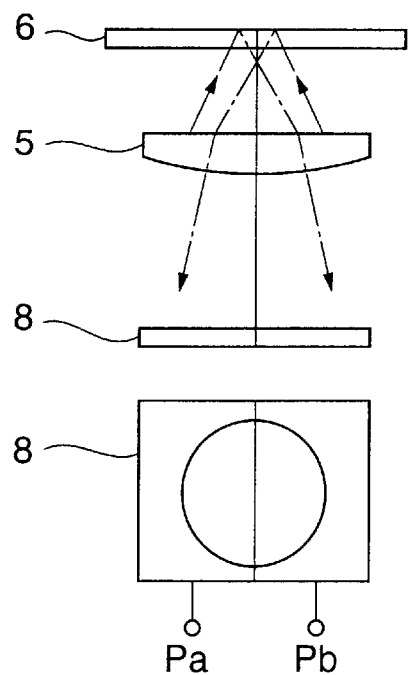
FIGS. 5A and 5B show a principle for illustrating tilt detection in a case where laser light which is not focused is used.
Figure 5B:
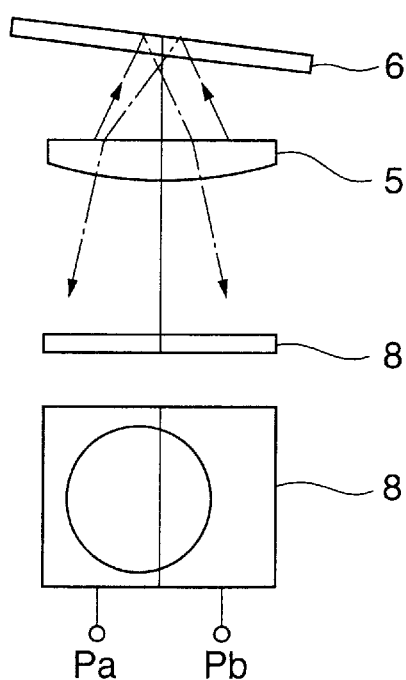

FIGS. 5A and 5B show a case where laser light which is not focused on the recording plane of the optical disc 6 (6a or 6b) is emitted by any one of the plurality of semiconductor lasers 1a or 1b to the optical disc 6. As shown in FIG. 5B, when a relative tilt develops between the objective lens 5 and the optical disc 6, the position of the laser light incident on the surface of the light-receiving element 8 changes. The difference Pa–Pb between one output Pa and the other output Pb of the two-piece light-receiving element 8 is obtained. When no tilt exists as shown in FIG. 5A, the difference Pa–Pb=0. However, when a tilt exists as shown in FIG. 5B, the one output Pa increases and the other output Pb decreases. As a result, the difference Pa–Pb has an amount corresponding to the tilt amount. Thus, the tilt detection can be performed.

Figure 6A:
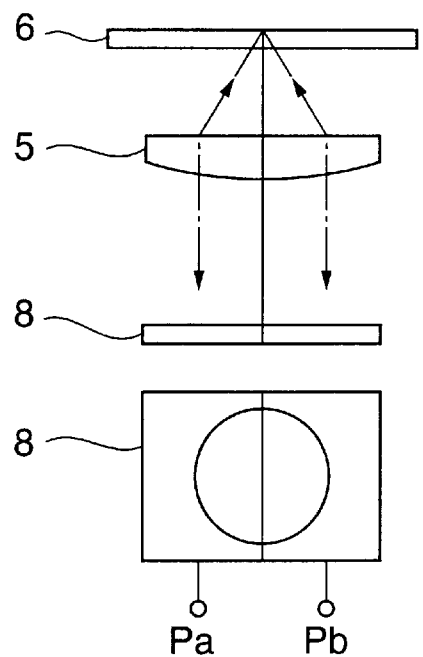
FIGS. 6A and 6B show a principle for illustrating tilt detection in a case where laser light which is focused is used.
Figure 6B:
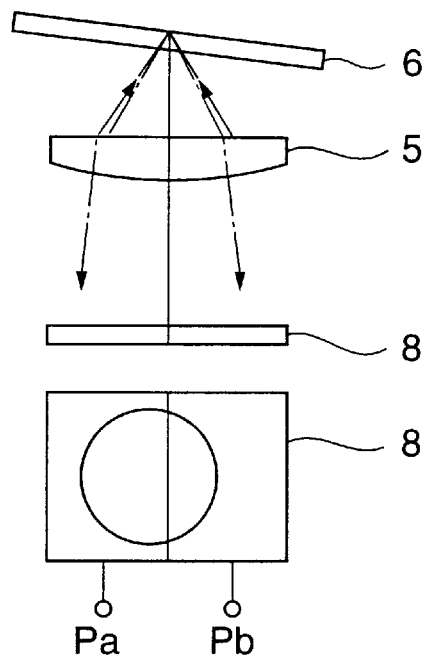

FIGS. 6A and 6B show a case where laser light which is focused on the recording plane of the optical disc 6 (6a or 6b) is emitted by any one of the plurality of semiconductor lasers 1a or 1b to the optical disc 6. As shown in FIG. 6B, when a relative tilt develops between the objective lens 5 and the optical disc 6, similarly to the case describe with reference to FIGS. 5A and 5B, the position of the laser light incident on the surface of the light-receiving element 8 changes. The difference Pa–Pb between one output Pa and the other output Pb of the two-piece light-receiving element 8 is obtained. When no tilt exists as shown in FIG. 6A, the difference Pa–Pb=0. However, when a tilt exists as shown in FIG. 6B, the one output Pa increases and the other output Pb decreases. As a result, the difference Pa–Pb has an amount corresponding to the tilt amount. Thus, the tilt detection can be performed.

Thus, in the first embodiment, any one of the semiconductor lasers 1a and 1b is used as the light source for detecting the tilt. Thereby, it is possible to perform the tilt detection by using the objective lens 5 which is originally used for recording/reproducing. As a result, basically, it is not necessary to provide any extra member special for the tilt detection, and it is possible to detect the tilt accurately. In particular, when the semiconductor laser 1a or 1b, which is not used for a recording/reproducing operation, is used for the tilt detection, it is possible to perform the tilt detection even during the recording/reproducing operation performed through the other semiconductor laser 1b or 1a. In this case, as described with reference to FIGS. 5A, 5B, 6A and 6B, the tilt detection is not obstructed whether the light emitted by the semiconductor laser 1a or 1b which is used for the tilt detection is focused on the optical disc 6 or is not completely focused thereon.

With reference to FIGS. 7A, 7B, 8A and 8B, a second embodiment of the present invention will now be described.

Figure 7A:
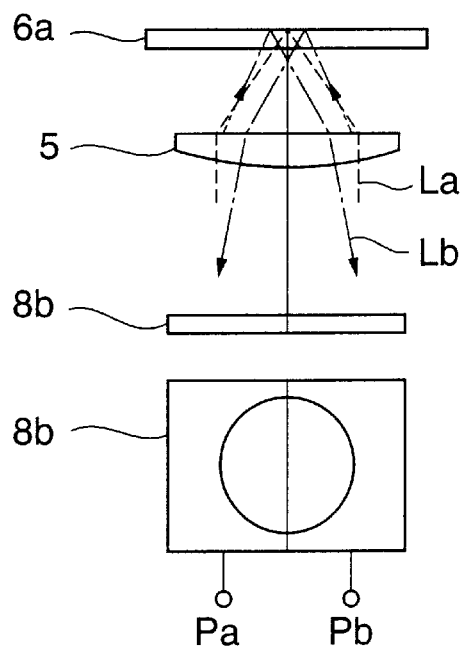
FIGS. 7A and 7B show a principle for illustrating tilt detection at a time recording/reproducing is performed on a DVD in a second embodiment of the present invention.
Figure 7B:
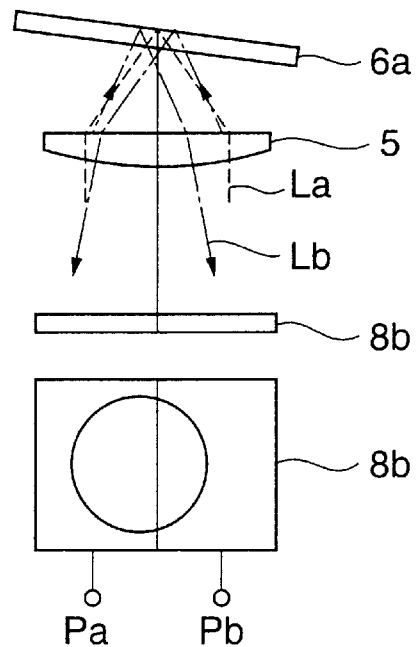

The same reference numerals are given to parts the same as those shown in the first embodiment, and a description thereof will be omitted (the same way is used in descriptions for other embodiments). FIGS. 7A and 7B show the principle of the tilt detection at the time of recording/reproducing performed on the DVD 6a. At this time, the laser light La emitted by the semiconductor laser 1a for the DVD of the wavelength of 635 nm is focused on the recording plane of the optical disc 6a. On the other hand, the laser light Lb emitted by the semiconductor laser 1b for the CD of the wavelength of 780 nm is not focused on the recording plane of the optical disc 6a. This semiconductor laser 1b is used as the light source for the tilt detection.

FIG. 7B shows that the position of the laser light Lb, incident on the surface of the light-receiving element 8b, changes, when the laser light, emitted by the semiconductor laser 1b which is one not used for recording/reproducing performed on the optical disc 6a, is incident on the optical disc 6a in a case where a relative tilt develops between the objective lens 5 and the optical disc 6a. The difference Pa−Pb=0 in the light-receiving element 8b when no tilt exists, as shown in FIG. 7A. However, when a tilt exists as shown in FIG. 7B, the one output Pa increases and the other output Pb decreases. As a result, the difference Pa−Pb has an amount corresponding to the tilt amount. Thus, the tilt detection can be performed.

Figure 8A:
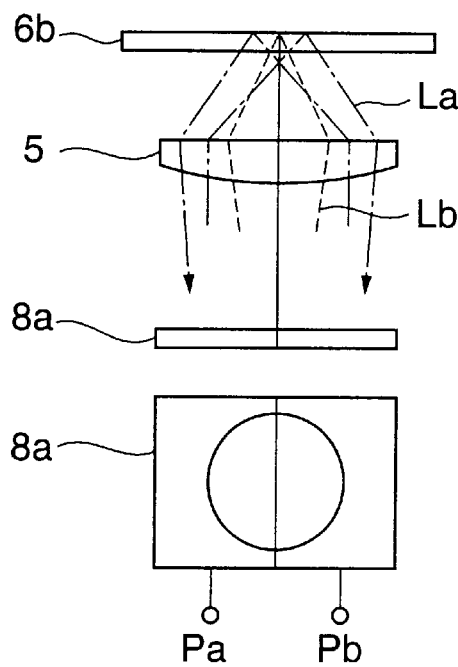
FIGS. 8A and 8B show a principle for illustrating tilt detection at a time recording/reproducing is performed on a CD.
Figure 8B:
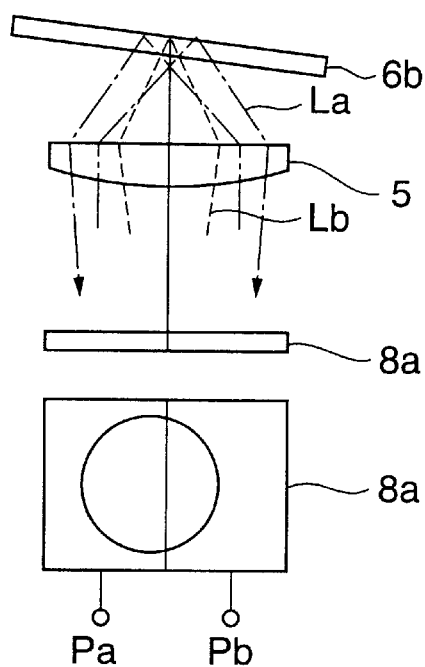

FIGS. 8A and 8B show the principle of the tilt detection at the time of recording/reproducing performed on the CD 6b. At this time, the laser light Lb emitted by the semiconductor laser 1b for the CD of the wavelength of 780 nm is focused on the recording plane of the optical disc 6b. On the other hand, the laser light La emitted by the semiconductor laser 1a for the DVD of the wavelength of 635 nm is not focused on the recording plane of the optical disc 6b. This semiconductor laser 1a is used as the light source for the tilt detection.

FIG. 8B shows that the position of the laser light La, incident on the surface of the light-receiving element 8a, changes, when the laser light, emitted by the semiconductor laser 1a which is one not used for recording/reproducing performed on the optical disc 6b, is incident on the optical disc 6b in a case where a relative tilt develops between the objective lens 5 and the optical disc 6b. The difference Pa−Pb=0 in the light-receiving element 8a when no tilt exists, as shown in FIG. 8A. However, when a tilt exists as shown in FIG. 8B, the one output Pa increases and the other output Pb decreases. As a result, the difference Pa−Pb has an amount corresponding to the tilt amount. Thus, the tilt detection can be performed.

In the examples shown in FIGS. 7A, 7B, 8A and 8B, it is assumed that, for the sake of simplification of the description, no light amount of the laser light La or Lb for recording/reproducing is inputted to the light receiving element 8b or 8a for the tilt detection.

Thus, in the second embodiment, basically, similarly to the case of the above-described first embodiment, at the time of recording/reproducing, the semiconductor laser 1b or 1a, which is one not used for the recording/reproducing, is used as the light source for the tilt detection, in the optical-pickup device provided with the plurality of semiconductor lasers 1a and 1b. As a result, the objective lens 5, which is originally used for recording/reproducing, can also be used for the tilt detection. Therefore, it is not necessary to provide any extra member for the tilt detection, and it is possible to perform the tilt detection accurately. Further, it is possible to always perform the tilt detection in real time even during a recording/reproducing operation. In particular, when the semiconductor laser 1a or 1b is used and a recording/reproducing operation is performed, the laser light Lb or La of the other semiconductor laser 1b or 1a is not focused on the optical disc 6a or 6b, that is, the laser light Lb or La is in a defocus condition. However, a focusing operation is always performed on the side of the semiconductor laser 1a or 1b for recording/reproducing. As a result, the focus-deviation amount on the side of the semiconductor laser 1b or 1a for the tilt detection is always constant. Therefore, the defocus condition on the side of the semiconductor laser 1b or 1a for the tilt detection is a stable defocus condition. Accordingly, it is possible to perform stable, accurate tilt detection even in the defocus condition. Further, it is possible to perform the tilt detection for the plurality of types of optical discs 6a and 6b having the different thicknesses of the substrates, corresponding to the plurality of semiconductor lasers 1a and 1b having the different wavelengths. Furthermore, the light-receiving element 8a which detects the information signal and servo signal based on the light reflected by the optical disc 6a is the same as the light-receiving element 8a which detects the tilt based on the light reflected by the optical disc 6b. Also, the light-receiving element 8b which detects the information signal and servo signal based on the light reflected by the optical disc 6b is the same as the light-receiving element 8b which detects the tilt based on the light reflected by the optical disc 6a. As a result, it is not necessary to provide an extra light-receiving element special for the tilt detection. Thus, it is possible to miniaturize the device and reduce the cost of the device.

Figure 9A:
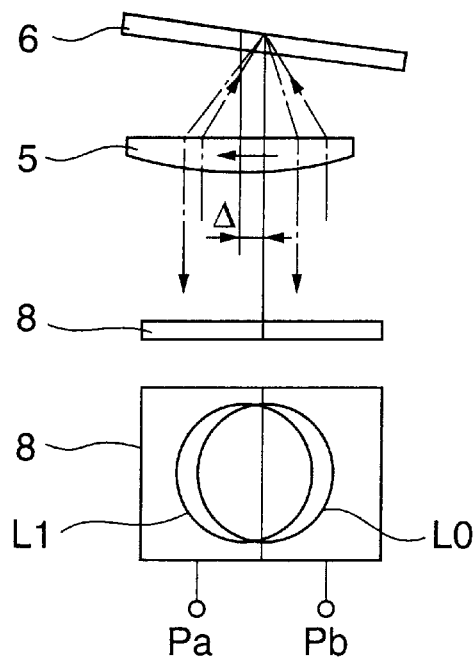
FIGS. 9A and 9B show a principle for illustrating tilt detection in a third embodiment of the present invention.
Figure 9B:
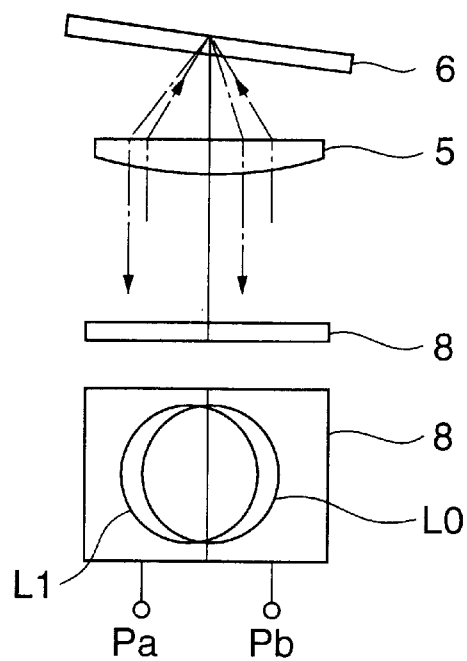

A third embodiment of the present invention will now be described with reference to FIGS. 9A and 9B. In each of the above-described first and second embodiments, any optical-axis deviation (a deviation developing between the ideal optical axis and the optical axis of the objective lens 5 at the time of tracking) does not exist. Generally speaking, when the optical-axis deviation exists, the offset developing due to the optical-axis deviation is included in the tilt signal, and an error increases. That is, if the optical-axis deviation exists in the optical system, it is not possible to determine whether the offset amount Δ is one developing due to the optical-axis deviation or one developing due to the tilt, as shown in FIG. 9A. Therefore, when the optical-axis deviation existing in the optical system is large, a countermeasure such as to provide a member for detecting the optical-axis deviation and to detect the optical-axis deviation, or the like. (In FIG. 9A, L0 is a spot on the light-receiving element 8 when no tilt exists, and L1 is a spot on the light-receiving element 8 when some tilt exists and some optical-axis deviation exists.) However, when no optical-axis deviation exists in the optical system, the offset amount Δ is determined only in accordance with the tilt, as shown in FIG. 9B. (In FIG. 9B, L0 is a spot on the light-receiving element 8 when no tilt exists and no optical-axis deviation exists, and L1 is a spot on the light-receiving element 8 when some tilt exists but no optical-axis deviation exists.) Therefore, it is possible to perform the tilt detection accurately. In the third embodiment, no optical-axis deviation exists in the optical system as a result of an actuator for the objective lens, not shown in the figures, being used, which actuator is such that no optical-axis deviation develops between the ideal optical axis and the optical axis of the objective lens at the time of tracking. It is preferable that such an arrangement is used not only in the optical pickups each provided with the plurality of semiconductor lasers 1a and 1b as in the above-described first and second embodiments, but also in a type of optical pickup in which a single light source is used for information reproduction and also for the tilt detection, for example, similarly.

Figure 10:
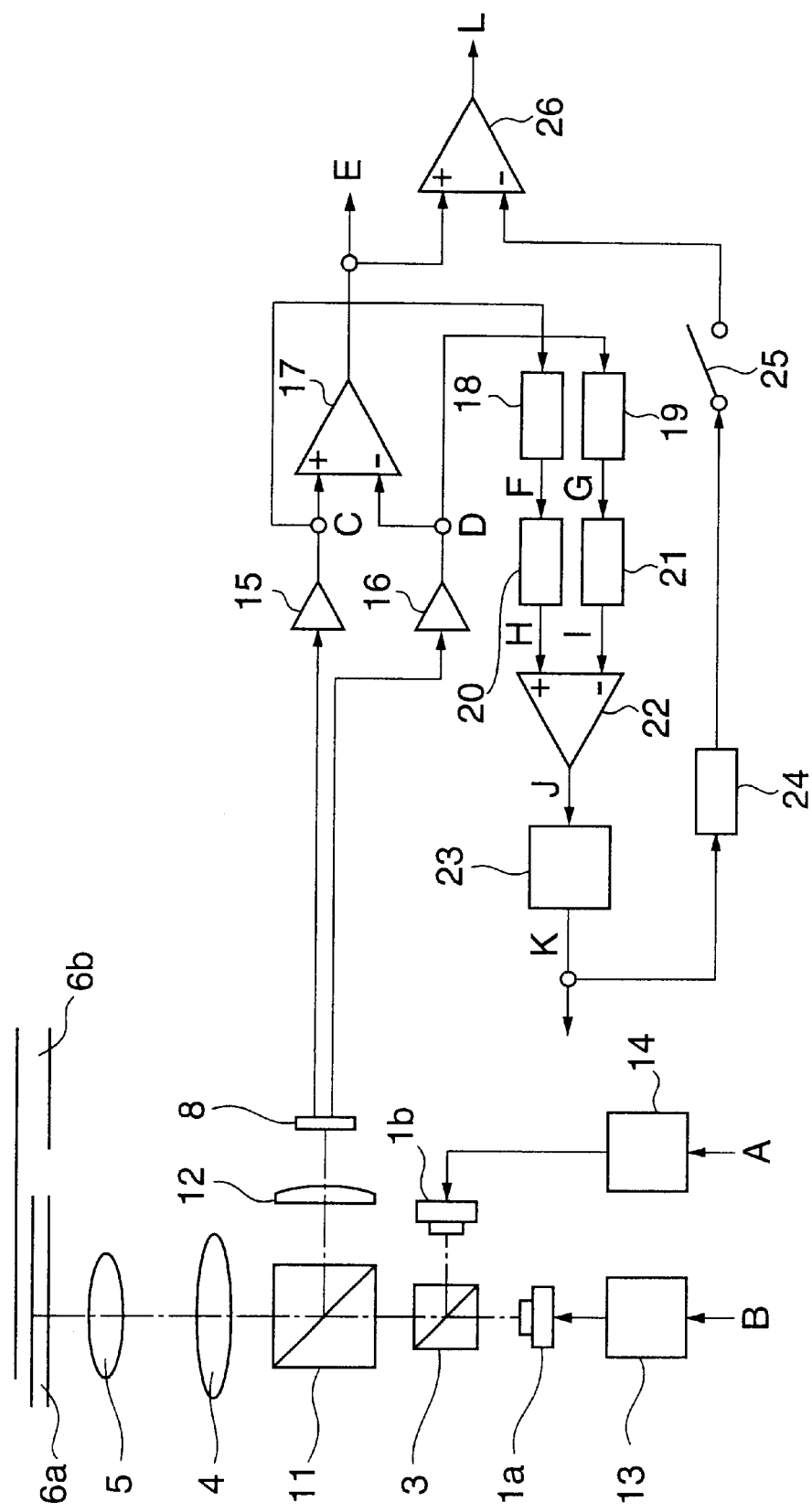
FIG. 10 shows a circuit arrangement and an optical system arrangement of an optical pickup in a fourth embodiment of the present invention.

A fourth embodiment of the present invention will now be described with reference to FIGS. 10, 11, 12 and 13. FIG. 10 shows an optical pickup and a signal processing system thereof in the fourth embodiment. Basically, the optical pickup shown in FIG. 10 conforms to the optical pickup shown in FIG. 4. However, in the fourth embodiment, instead of the light-receiving elements 8a and 8b, only a light-receiving element 8 which is used with both the semiconductor lasers 1a and 1b in common is used.

The laser light of the wavelength of 635 nm emitted by the semiconductor laser 1a is transmitted by the two-wavelength-synthesis prism 3, is transmitted by a beam splitter 11, then, is caused to become an approximately parallel light by the coupling lens 4, then, is focused by the objective lens 5 on the recording plane of the DVD 6a as a minute spot, and is used for information recording/reproducing. The light reflected by the optical disc 6a is caused to become an approximately parallel light by the objective lens 5 again, is caused to become a converging light by the coupling lens 4, then, is reflected by the polarization plane of the beam splitter 11, is given astigmatism by a cylindrical lens 12, and is incident on the two-piece light-receiving element 8 which is used for detecting the information signal, and the servo signal of tracking error and focus error.

On the other hand, the laser light of the wavelength of 780 nm emitted by the semiconductor laser 1b is reflected by the two-wavelength-synthesis prism 3, is transmitted by the beam splitter 11, then, is caused to become an approximately parallel light by the coupling lens 4, then, is focused by the objective lens 5 on the recording plane of the CD 6b as a minute spot, and is used for information recording/reproducing. The light reflected by the optical disc 6b is caused to become an approximately parallel light by the objective lens 5 again, is caused to become a converging light by the coupling lens 4, then, is reflected by the polarization plane of the beam splitter 11, is given astigmatism by the cylindrical lens 12, and is incident on the two-piece light-receiving element 8 which is used for detecting the information signal, and the servo signal of tracking error and focus error.

In the fourth embodiment, recording/reproducing is performed using any one of the two semiconductor lasers 1a and 1b. However, the light-receiving element 8 for the tilt detection is used when any one of the semiconductor lasers 1a and 1b is used, in common. In the arrangement shown in FIG. 10, the circuit for the tilt detection is shown. Driver circuits 13 and 14 for driving so as to cause the semiconductor lasers 1a and 1b to emit light based on signals B and A, respectively, are connected to the semiconductor lasers 1a and 1b, respectively. Signal-detecting amplifiers 15 and 16 are connected to the two output terminals of the two-piece light-receiving element 8, respectively, the two output terminals corresponding to the two light-receiving areas of the two-piece light-receiving element 8, respectively. A differential amplifier 17 which obtains the difference between signals C and D, outputted from the signal-detecting amplifiers 15 and 16, respectively, is provided. Further, narrow-band pass filters (BPF) 18 and 19, to which the signals C and D are inputted, respectively, are provided. Further, absolute-value circuits 20 and 21, to which signals F and G, outputted from these BPF 18 and 19, respectively, are inputted, respectively, are provided. Further, a differential amplifier 22, which obtains the difference between signals H and I, outputted from these absolute-value circuits 20 and 21, respectively, is provided. A low-pass filter LPF (or peak hold circuit) 23 is connected to the output terminal of the differential amplifier 22. Further, a gain adjustment circuit 24 is provided, which adjusts a gain for a signal K, outputted from the LPF (or peak hold circuit) 23. The signal obtained as a result of the level of the signal K being adjusted through the gain adjustment circuit is inputted to a differential amplifier 26 through an offset correction switch 25 which is turned on after correction. A signal E outputted from the differential amplifier 17 is also inputted to the differential amplifier 26.

Figure 11:
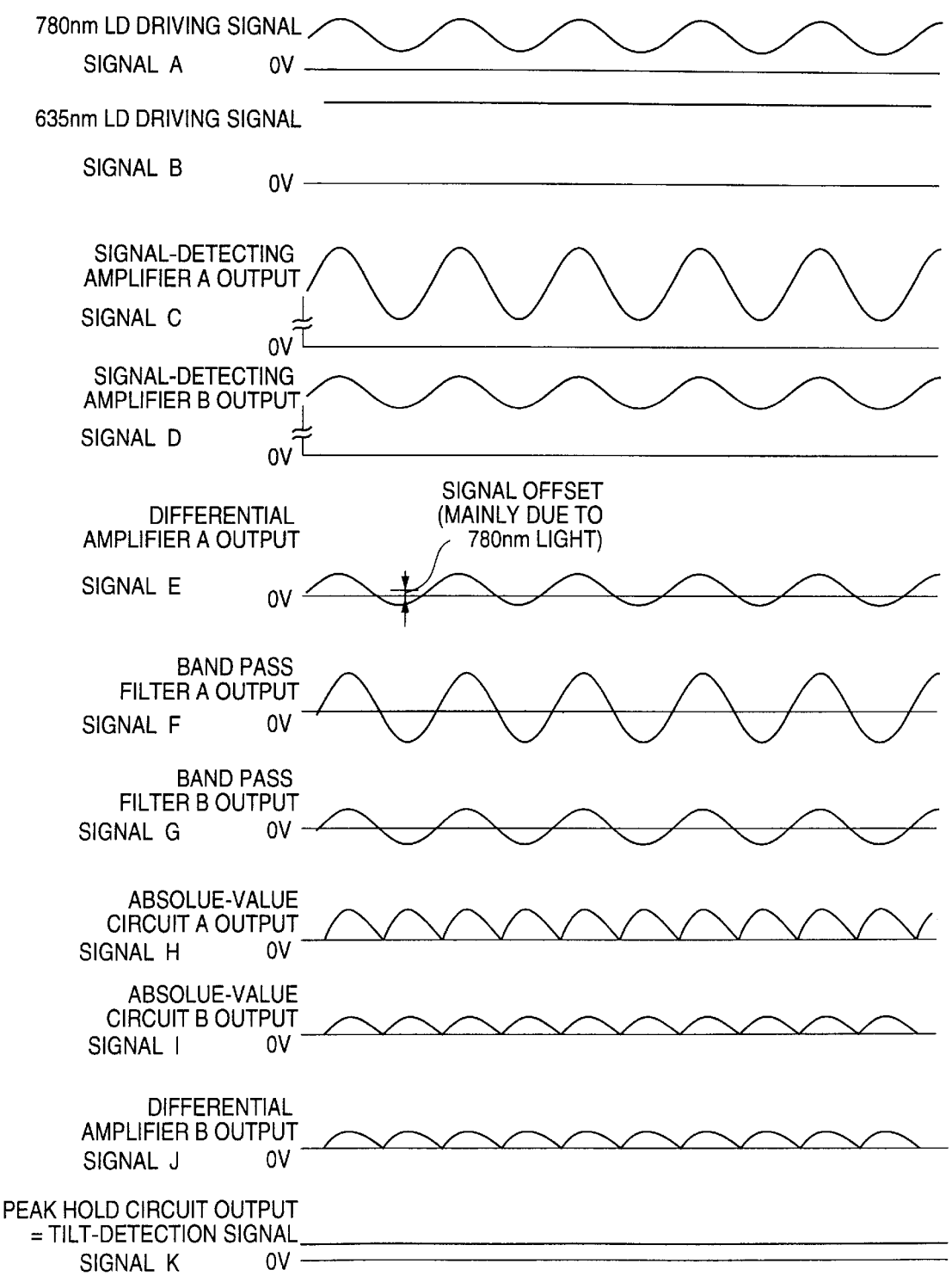
FIG. 11 shows a time chart showing a tilt-detecting operation.
Figure 12:
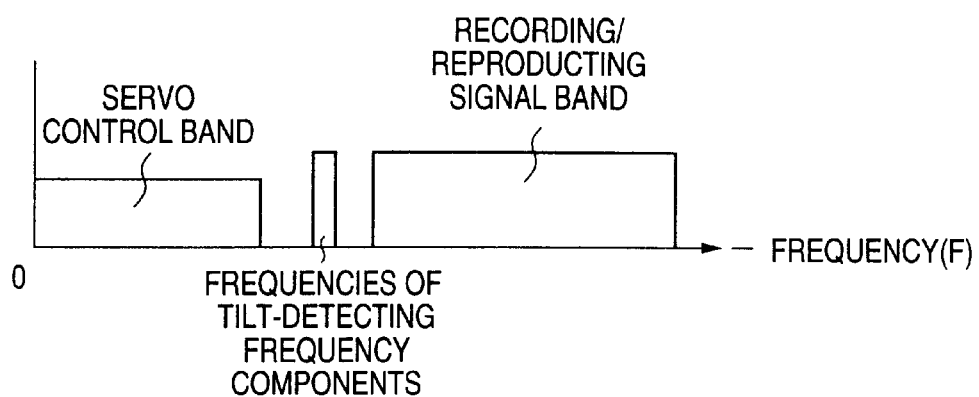
FIG. 12 shows a graph showing a frequency distribution.

FIG. 11 shows a time chart for illustrating the detection operation. Here, for example, data on the optical disc 6a is reproduced using the semiconductor laser 1a of the wavelength of 635 nm, and the semiconductor laser 1b of the wavelength of 780 is used for the tilt detection. First, a 780-LD driving signal (signal A), shown in the figure, having an intensity-modulation waveform, including an alternating-current component, the basic frequency of which waveform is fixed, is input to the semiconductor laser 1b for modulating the intensity of the laser light so that the laser light, the intensity of which has been modulated by the intensity modulation waveform, is emitted by the semiconductor laser 1b. As this intensity-modulation waveform of the signal A, a predetermined waveform is selected. The frequency components of the predetermined waveform have only frequencies outside of the control band, that is, the frequency components have frequencies to which the focusing-and-tracking servo system does not respond. Also, the frequencies of the frequency components of the predetermined waveform have only frequencies inside of a frequency band, the frequencies of which frequency band have a small influence on increase in jitter in the reproduced signal. FIG. 12 is a graph showing the tilt-detecting frequency components of the thus-selected intensity-modulation waveform. The semiconductor laser 1a is controlled and driven so that laser light of a fixed reproduction power is emitted therefrom.

In such a driving condition, when the optical disc 6a tilts, alternating-current signals C and D having amplitudes different from one another are outputted, as detection signals, from the signal-detecting amplifiers 15 and 16, respectively, as shown in FIG. 11. For the sake of simplification of the description, it is assumed that the optical disc 6a has no data thereon in this example. Thus, even in a case where there is little tracking error, when there is a tilt, the direct-current component included in the laser light emitted by the semiconductor laser of the wavelength of 780 nm is included in each of the signals C and D outputted from the signal-detecting amplifiers 15 and 16. Then, the difference between the signals C and D is obtained through the differential amplifier 17. As a result, the signal E is outputted from the differential amplifier 17. The signal E has the alternating-current amplitude approximately proportional to the tilt, and includes the signal offset shown in the figure.

The signals outputted from the signal-detecting amplifiers 15 and 16 pass through the BPF 18 and 19, respectively. (When the detection is performed in real time, the band of each BPF is determined depending on the frequency components of the detection signal used at the time of recording/reproducing. Accordingly, depending on the recording/reproducing system, the filters themselves or the characteristics thereof may be changed depending on whether the mode at the time of the detection is the recording mode or reproducing mode.) As a result, signals such as the signals F and G each including no direct-current component but including only an alternating-current component are obtained. Thus, each of the BPF 18 and 19 also has a function of removing the direct-current component in a case where there is a tracking error. Thereby, the difference between the amplitudes of the signals F and G is the signal having the amplitude proportional to the tilt. The signals F and G are inputted to the absolute-value circuits 20 and 21, respectively. Then, the signals H and I are outputted from the absolute-value circuits 20 and 21, respectively. Each of the signals H and I includes only the positive amplitude. Then, the differential amplifier 22 is used for obtaining the difference between the signals H and I. Then, the signal outputted from the differential amplifier 22 passes through the LPF (or peak hold circuit) 23. As a result, the direct-current signal K having the amplitude proportional to the tilt is obtained. It is possible that, instead of the absolute-value circuits 20 and 21, positive-value circuits (each of which outputs only the positive value of an alternating-current signal) are used.

As the intensity-modulation waveform which is used for modulating the intensity of the laser light to be outputted from the semiconductor laser 1b or 1a, the predetermined waveform should be selected. The frequencies of the frequency components of the predetermined waveform are included in a frequency band which does not include the frequency components used at the time of recording, in order to enable the tilt detection in real time at the time of recording. For example, a waveform, the frequencies of the frequency components of which are sufficiently lower than the frequency components used at the time recording should be selected. (It should be noted that, when a pulse signal is used as the signal for modulating the intensity of the laser light to be outputted from the semiconductor laser 1b or 1a, the pulse signal includes higher frequency components.)

Figure 13A:
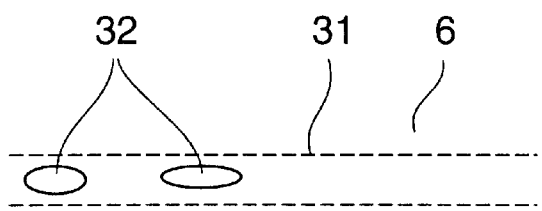
FIGS. 13A and 13B show a plan view showing examples of track arrangements.
Figure 13B:
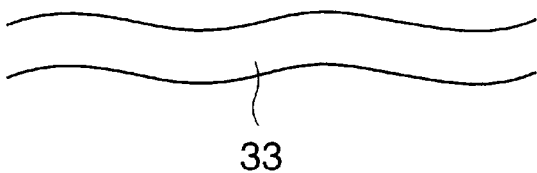

Further, generally speaking, on each of the optical discs 6a and 6b, an arrangement is provided in order to enable the incident laser light to access to the data on the disc, or in order to cause the recording/reproducing frequency and the disc rotation speed to become target values. As a typical example, there is a method, as shown in FIG. 13A, in which a pits 32 are formed in the track of the optical disc 6a or 6b, the pits being used as an address signal. As another typical example, there is a method, as shown in FIG. 13B, in which the track itself is formed to wobble (meander), and, by changing the wobbling frequency, the track can have address information, and, also, the center frequency (carrier) of the wobbling frequency is used as a signal for controlling the motor for rotating the optical disc 6a or 6b, or used as a signal for generating the basic clock signal of the recording signal. It is preferable to select a predetermined waveform, as the waveform (intensity-modulation waveform) for modulating the intensity of the laser light to be outputted from the semiconductor laser 1b or 1a for the tilt detection. The frequency of the frequency components of the predetermined waveform are included in a frequency band which does not include, or includes a small amount of, the frequency components of the various signals (signals generated from the pits 32, the wobbling track 33 or the like) generated based on the information formed on the optical disc 6a or 6b as a result of the laser light being applied to the optical disc 6a or 6b.

Accordingly, in the fourth embodiment of the present invention, because the common single light-receiving element 8 is used for the two semiconductor laser 1a and 1b, it is possible to further miniaturize and reduce the cost of the optical pickup. Further, because the light, the intensity of which has been modulated by the above-mentioned intensity-modulation waveform including the alternating-current component, the basic frequency of which waveform is fixed, is emitted from the semiconductor laser which is one not used for recording/reproducing, it is possible to perform the tilt detection in real time at the time of recording/reproducing without any problem. In particular, as the intensity-modulation waveform used for the tilt detection, the predetermined waveform is selected. The frequencies of the frequency components of the predetermined waveform are those outside of the control band, that is, are those to which the focusing-and-tracking servo system does not respond. Further, the frequency components of the predetermined waveform do not include the frequency components of the recording signal or only include a small amount of the frequency components of the recording signal. Alternatively, the frequency components of the predetermined waveform only include the frequency components which have none of or a small amount of influence on increase in jitter in the reproduced signal. Alternatively, the frequency components of the predetermined waveform do not include or only include a small amount of the frequency components of the various signals generated based on the information formed on the optical disc 6a or 6b. As a result, the tilt detection can be performed in real time without problem.

In a case where the intensity-modulation waveform is a sine wave, the frequency thereof is one outside of the control band, that is, is one to which the focusing-and-tracking servo system does not respond. Further, the frequency of this sine wave is not included in the frequency components of the recording signal. Alternatively, the frequency of this sine wave is a frequency which has none of or a small amount of influence on increase in jitter in the reproduced signal. Alternatively, the frequency of this sine wave is not included in the frequencies of the frequency components of the various signals generated based on the information formed on the optical disc 6a or 6b. As a result, the tilt detection can be performed in real time without problem.

However, it is preferable that a predetermined waveform be selected as the above-mentioned intensity-modulation waveform. The frequencies of the frequency components of the predetermined waveform are those outside of the control band, that is, are those to which the focusing-and-tracking servo system does not respond. Further, the frequency components of the predetermined waveform do not include the frequency components of the recording signal or only include a small amount of the frequency components of the recording signal. Further, the frequency components of the predetermined waveform only include the frequency components which have none of or a small amount of influence on increase in jitter in the reproduced signal. Further, the frequency components of the predetermined waveform do not include or only include a small amount of the frequency components of the various signals generated based on the information formed on the optical disc 6a or 6b. As a result, the tilt detection can be performed in real time without problem, more positively.

In a case where the intensity-modulation waveform is a sine wave, the frequency thereof is one outside of the control band, that is, is one to which the focusing-and-tracking servo system does not respond. Further, the frequency of this sine wave is not included in the frequency components of the recording signal. Further, the frequency of this sine wave is a frequency which has none of or a small amount of influence on increase in jitter in the reproduced signal. Further, the frequency of this sine wave is not included in the frequency components of the various signals generated based on the information formed on the optical disc 6a or 6b. As a result, the tilt detection can be performed in real time without problem, more positively.

Figure 14:
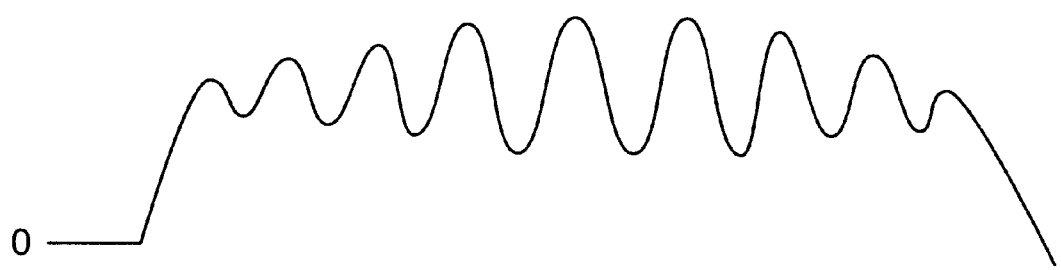
FIG. 14 shows a waveform for illustrating a fifth embodiment of the present invention.

A fifth embodiment of the present invention will now be described with reference to FIG. 14. Basically, the above-described tilt detecting method in the fourth embodiment is also used in the fifth embodiment. In particular, the fifth embodiment is advantageous in a case where the two semiconductor lasers 1a and 1b having the different wavelengths are contained in a single package. In this embodiment, in order to prevent the semiconductor lasers 1a and 1b from deteriorating due to heat in a case where the two semiconductor lasers 1a and 1b are arranged so as to be in proximity to one another, the tilt-detecting operation is performed intermittently. With regard to the ON/OFF control of the semiconductor laser 1a or 1b for the tilt detection, as shown in FIG. 14, at the beginning of the tilt detection, the level of the laser light emitted by the semiconductor laser 1a or 1b for the tilt detection is caused to rise in a manner in which the intensity of the emitted light increases gradually, and, also, the amplitude increases gradually so as to become the fixed alternating-current amplitude. At the end of the tilt detection, the level of the laser light emitted by the semiconductor laser 1a or 1b for the tilt detection is caused to decay in a manner in which the intensity of the emitted light decreases gradually, and, also, the amplitude decreases gradually from the fixed alternating-current amplitude.

In this embodiment, even in the case where the two semiconductor lasers 1a and 1b are arranged in proximity-to one another, it is possible to prevent the lasers from deteriorating due to heat generated therefrom. Further, it is possible to reduce the influence (noise) on the servo signal and reproduced signal, which influence (noise) occurs at the time of the rising and the time of decaying of the tilt-detecting signal.

It is not necessary to always perform the tilt detection in an operation mode such as at the time of recording/reproducing, standing by, seeking or the like. When a tilt is detected on a track of the optical disc 6a or 6b, tilt correction is performed using the tilt data obtained from the thus-detected tilt. Then, within a track range in which change in tilt does not affect the operation characteristics of the disc device, the same tilt data is used and the tilt correction is performed. When it is likely that the optical pickup moves to exit from the track range in which change in tilt does not affect the operation characteristics of the disc device, the tilt-detecting operation is performed again, and the tilt correction is performed using the thus-obtained new tilt data. Further, in the operation mode in which the tilt-detecting operation cannot be performed, the tilt correction is performed using the tilt data which was detected in the tilt-detecting operation performed before the disc device enters this operation mode. At the time of seeking, the optical pickup moves at high speed. However, this operation mode is a mode in which the influence of the tilt is small. Therefore, tilt data detected when the disc was loaded in the disc device may be used, or tilt data, which was obtained as a result of updating performed before the seeking operation starts, may be used. As the tilt correction method, a well-known method such as that in which the entire seeking system is inclined, or the like, may be used.

A sixth embodiment of the present invention will now be described with reference FIG. 10. For example, in a case where detection of the tracking-error signal is performed using the laser light of the wavelength of 635 nm (at the time of recording/reproducing using the semiconductor laser 1a), the signal E outputted from the differential amplifier 17 includes the offset due to the laser light of the wavelength of 780 nm used for the tilt detection. Therefore, the signal E cannot be used as the tracking error signal as it is. When there is no tilt, there is no output, developing due to the laser light of the wavelength of 780 nm, in the output of the differential amplifier 17. However, when there is a tilt, the signal offset is included in the signal E, as shown in FIG. 11. In particular, the direct-current component of the signal offset is problematic. In the sixth embodiment, using the tilt detection signal K, after the level of this signal is adjusted through the gain adjustment circuit 24, the direct-current component, due to the laser light of the wavelength of 780 nm, in the signal E outputted from the differential amplifier 17 is removed through the differential amplifier 26. Thus, the tracking signal L which is obtained as a result of the offset component generated due to the tilt detection being removed is obtained.

In FIG. 10, the gain adjustment circuit 24 not only performs the above-described gain adjustment (level adjustment) but also performs gain adjustment (level adjustment) in a case where, contrary to the above-described case, reproduction of information on the optical disc 6b is performed using the laser light of the wavelength of 780 nm, and the tilt detection is performed using the laser light of the wavelength of 635 nm. In fact, in this case, the amount of direct-current correction to be performed so as to obtain the tracking error signal may be different due to the tilt-detecting signal. In order to obtain the appropriate amount of direct-current correction, the gain adjustment circuit 24 is used for correcting the level of the signal E. Until the gain of the gain adjustment circuit 24 is adjusted, the offset-correction switch 25 is in its turned-off state. The adjustment of the gain will now be described. After the focus-on, the semiconductor laser on the side of the tilt detection is in its turned-off state, the seeking operation is performed a little, and the level 'a' of the mean direct-current offset of the S-shape tracking-error signal of the signal E (or the final tracking-error signal L) is detected. Then, the semiconductor laser on the side of the tilt detection is turned on, so that the laser light is emitted therefrom, which laser light is obtained as a result of intensity modulation with the intensity-modulation waveform, shown in FIG. 11 (signal A), the seeking operation is performed on an approximately same area, the level 'b' of the mean direct-current offset of the S-shape tracking-error signal of the signal E (or the final tracking-error signal L) is detected. Then, the difference between these levels 'a' and 'b' of the mean direct-current offsets is calculated. At the same time, the level 'c' of the mean direct-current signal of the tilt-detection signal detected during this seeking operation is obtained. The gain (a−b)/c is set so that the output of the gain adjustment circuit 24 is equal to the difference (a−b). After this gain setting operation is finished, the offset-correction switch 25 is turned on.

The above-described offset correction is not necessary in a case where light-receiving elements are provided for the 635 nm system and 780 nm system, respectively. Therefore, in this case the gain adjustment circuit 24, offset-correction switch 25 and the differential amplifier 26 are not needed.

In a case where the single light-receiving element 8 for detecting the focus-error signal is used for the 635-nm-wavelength-system detection and also for the 780-nm-wavelength-system detection in common, when the laser light of the wavelength of 635 nm is used for detecting the focus-error signal, for example, an offset is included in the focus-error signal due to influence of the laser light of the wavelength of 780 nm (used for tilt detection).

The offset component in the focus-error signal is removed in a similar method. FIG. 10 shows the arrangement in which the radial tilt is detected. In the case where the offset is included in the focus-error signal due to the laser light for the tilt detection, offset correction can be performed using the same circuit as the circuit shown in FIG. 10. That is, the offset correction can be performed as a 10 result of the circuit same as that in the case of FIG. being connected to the output terminals of a twopiece light-receiving element or two light-receiving elements provided for detecting the focus-error signal. The gain of the gain adjustment circuit is set as a result of detecting the offset in the focus-error signal between a time the semiconductor laser on the side of the tilt detection is its turned-off state and a time the semiconductor laser on the side of the tilt detection is in its turned-on state. For example, the S-shape focus-error signal is detected as a result of lifting and lowering the objective lens 4 at each of the time the semiconductor laser on the side of the tilt detection is in its turned-off state and the time the semiconductor laser on the side of the tilt detection is its turned-on state. Then, the offset between the time the semiconductor laser on the side the tilt detection is in its turned-off state and the time the semiconductor laser on the side of the tilt detection is in its turned-on state is detected. Such an operation is performed at several positions on the optical disc 6a or 6b, and the mean values are obtained. Thereby, the value corresponding to (a–b) is detected. Then, the offset component can be removed in a process similar to that in the above-described case for the tracking-error signal.

Accordingly, in the sixth embodiment, the offset included in the focus-error signal or tracking-error signal, obtained based on the light reflected by the recording plane of the optical disc 6a or 6b, due to the tilt-detecting light can be removed based on the detected tilt data. Thereby, it is possible to obtain the correct focus-error signal or tracking-error signal, and, as a result, it is possible to perform proper focusing control or tracking control.

Figure 15:
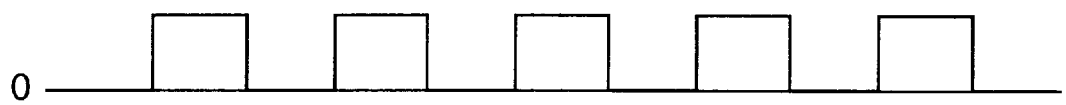
FIG. 15 shows a waveform for illustrating a seventh embodiment of the present invention.

A seventh embodiment of the present invention will now be described with reference to FIG. 15. In this embodiment, when the semiconductor laser 1a or 1b used for the tilt detection is driven to emit light, instead of the sine wave-like waveform shown in FIG. 11 (signal A), a pulse signal, having a rectangular waveform, the basic frequency of which waveform is fixed, such as that shown in FIG. 15, is used as the above-mentioned intensity-modulation waveform. This variation can also be applied to each of the embodiments described above. In this case, as the waveform of this pulse signal, a predetermined waveform, the frequency components of which fulfill conditions similar to those in the case described above with reference to FIG. 12, is selected. Such successive pulses include higher-order harmonics. The waveform of this signal should be selected so that the higher harmonics do not have any adverse influence at each of the time of recording and the time of reproducing. In order to reduce higher harmonics, it is preferable to use the signal not having a waveform of a rectangular pulse but having a waveform close to a sine wave.

Also in this case in which the intensity-modulation waveform is like a rectangular waveform as shown in FIG. 15, as this intensity-modulation waveform used for the tilt detection, a predetermined waveform is selected. The frequencies of the frequency components of the predetermined waveform are those outside of the control band, that is, those to which the focusing-and-tracking servo system does not respond. Further, the frequency components of the predetermined waveform do not include the frequency components of the recording signal or include a small amount of the frequency components of the recording signal. Alternatively, the frequency components of the predetermined waveform include the frequency components which have none of or a small amount of influence on increase in jitter in the reproduced signal. Alternatively, the frequency components of the predetermined waveform include none of or a small amount of the frequency components of the various signals generated based on the information formed on the optical disc 6a or 6b. As a result, the tilt detection can be performed in real time without problem.

However, it is preferable that a predetermined waveform is selected as the above-mentioned intensity-modulation waveform. The frequencies of the frequency components of the predetermined waveform are those outside of the control band, that is, are those to which the focusing-and-tracking servo system does not respond. Further, the frequency components of the predetermined waveform do not include the frequency components of the recording signal or include a small amount of the frequency components of the recording signal. Further, the frequency components of the predetermined waveform include the frequency components which have none of or a small amount of influence on increase in jitter in the reproduced signal. Further, the frequency components of the predetermined waveform include none of or a small amount of the frequency components of the various signals generated based on the information formed on the optical disc 6a or 6b. As a result, the tilt detection can be performed in real time without problem, more positively.

Thus, the intensity-modulation waveform used for the tilt detection is not limited to a sine wave-like waveform, but may be a rectangular-like waveform.

In each of the above-described fourth, fifth, and seventh embodiments, it is possible that no optical-axis deviation exists in the optical system as a result of an actuator for the objective lens being used, which actuator is such that no optical-axis deviation develops between the ideal optical axis and the optical axis of the objective lens at the time of tracking, as in the above-described third embodiment.

Figure 16:
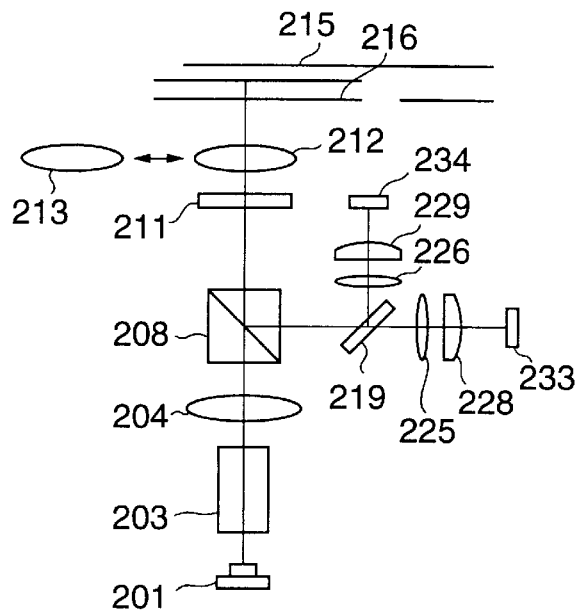
FIG. 16 shows a general arrangement of an optical-pickup device in an eighth embodiment of the present invention.

FIG. 16 shows a general arrangement of an eighth embodiment of an optical-pickup device according to the present invention.

The optical-pickup device shown in FIG. 16 performs recording/reproducing on both a CD 215 (optical recording medium) on which recording/reproducing of information is performed using infrared laser light and an S-DVD 216 (optical recording medium, the name 'S-DVD' is a temporary name and has not been standardized) on which recording/reproducing of information is performed using blue laser light, the wavelength of which light is half of the wavelength of the infrared laser light.

As shown in the figure, the optical-pickup device in the eighth embodiment includes an infrared semiconductor laser 201, a wavelength-converting element 203, a collimator lens 204, a polarization beam splitter 208, a quarter-wave plate 211, an objective lens 212 for the CD, an objective lens 213 for the S-DVD, a dichroic mirror 219, a detection lens 225 for the CD, a cylindrical lens 228 for the CD, a detector 233 for the CD, a detection lens 226 for the S-DVD, a cylindrical lens 229 for the S-DVD and a detector 234 for the S-DVD. The infrared laser light emitted by the semiconductor laser 201 is incident on the wavelength-converting element 203. From the other end surface of the wavelength-converting element 203, the infrared laser light of the original wavelength and the blue laser light, the wavelength of which is half of the wavelength of the infrared laser light, are emitted.

The wavelength-converting element 203 will now be described.

As the wavelength-converting element 203, a second-harmonic generating element which fulfills a quasi phase matching condition may be used, for example. When the wavelength-converting element 203 is the second-harmonic generating element, part of the infrared laser light incident on the wavelength-converting element 203 is converted into second harmonic components having the wavelength which is half of the wavelength of the infrared laser light. Normally, the thus-generated second harmonic components are canceled out by each other so that a large output cannot be obtained. Therefore, a region in which the polarization direction is inverted is formed in the substrate of the wavelength-converting element 203. This region adjusts the phases of the second harmonic components. As a result, the generated second harmonic components are added to each other, so that a large light output can be obtained. Such a method is called the quasi phase matching condition. By using the second harmonic generating element, which fulfills the quasi phase matching condition, as the wavelength-converting element 203, it is possible to obtain the blue laser light, the intensity of which light is high.

The infrared laser light and blue laser light emitted from the wavelength-converting element 203 are collimated by the collimator lens 204. The thus-obtained light is transmitted by the polarization beam splitter 208 as it is, so that the light is incident on the optical recording medium 215 (216). The light reflected by the optical recording medium 215 (216) is reflected by the polarization plane of the polarization beam splitter 208, and is incident on a detection optical system including the detector 233. The infrared laser light and blue laser light emitted from the wavelength-converting element 203 are incident on the quarter-wave plate 211. When the infrared laser light and blue laser light pass through the quarter-wave plate 211, the vibration planes thereof are rotated by ¼ wavelengths, respectively, and the infrared laser light and blue laser light are incident on the objective lens 212 (211) which focuses the infrared laser light and blue laser light on the information recording plane of the optical recording medium 215 (216).

The quarter-wave plate 211 will now be described.

In order to enable conversion of both the blue laser light (the second wavelength: λ2) and infrared laser light (the first wavelength: λ1) from the linearly polarized light into the circular polarized light or from the circular polarized light into the linearly polarized light, the crystal structure of the quarter-wave plate is arranged so that, in a thickness 't', the phase differences between the ordinary rays (the refractive indexes: no) and the extraordinary rays (the refractive indexes: ne) are ¼ of λ2 and λ1, respectively. In other words, the crystal which fulfills the following equations (1) and (2) is selected:

$$\Delta n1 \times t = \{(2m+1)/4\} \times (\text{first wavelength}) \ (m=0, 1, 2, \ldots) \quad (1);$$

and $$\Delta n2 \times t = \{(2M+1)/4\} \times (\text{second wavelength}) \ (M=0, 1, 2, \ldots) \quad (2)$$

where:
  $\Delta n1$ represents (no−ne) for the laser light of the first wavelength;
  $\Delta n2$ represents (no−ne) for the laser light of the second wavelength; and
  't' represents the thickness of the quarter-wave plate.

The arrangement of the quarter-wave plate 211 is not limited to the above-described arrangement, but it is also possible that two quarter-wave plates are provided for the wavelengths (λ1 and λ2), respectively, and these quarter-wave plates are mechanically replaceable for the light path, that is, a mechanism is provided, by which mechanism it is possible to select one of the following two states: a first state in which one of these quarter-wave plates is mechanically inserted into the light path while the other is mechanically removed from the light path; and a second state in which the other of these quarter-wave plates is mechanically inserted into the light path while the one is mechanically removed from the light path.

The polarization beam splitter 208 will now be described.

Figure 17:
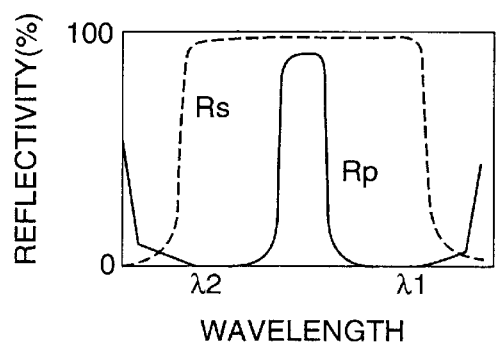
FIG. 17 shows characteristics of a polarization beam splitter.

The polarization beam splitter 208 uses the separation characteristic of the polarized-light components (s-polarized light, p-polarized light) in a multiple-layer film. When the polarization beam splitter 208 has the characteristics shown in FIG. 17, the infrared laser light and blue laser light emitted from the wavelength-converting element 3 as the p-polarized light are transmitted by the polarization beam splitter 208 approximately without reflection. In FIG. 17, Rp represents the reflectivity for the p-polarized light and Rs represents the reflectivity for the s-polarized light. As shown in FIG. 17, the band in which Rp is high is very narrow in comparison to the band in which Rs is high. Therefore, it can be seen that, the laser light of the first wavelength and second wavelength which is the s-polarized light is reflected but the laser light of the first wavelength and second wavelength which is the p-polarized light is not reflected. Conversely, after being reflected by the optical recording medium 215 (216), and, then, passing through the quarter-wave plate 211 and being converted into the s-polarized light thereby, the infrared laser light and blue laser light are reflected by the polarization beam splitter 208, and, as a result, the light path thereof is bent by 90 degrees.

The objective lenses 212 and 213 will now be described.

Figure 18:
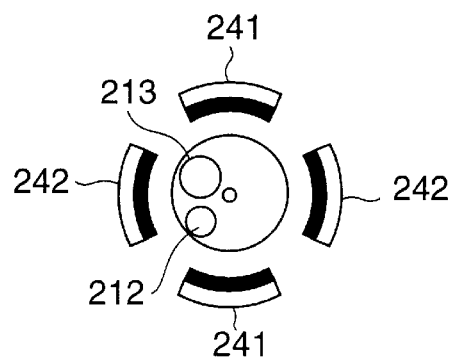
FIG. 18 shows an arrangement of an axis sliding and rotating actuator.

The objective lens 212, which is used for recording/reproducing performed on the currently used CD 215 using the infrared laser light, has the numerical aperture of 0.5 designed for the optical recording medium, the thickness of the substrate of which is 1.2 mm. The objective lens 213, which is used for recording/reproducing performed on the S-DVD 216 using the blue laser light, has the predetermined numerical aperture designed for the thickness of the substrate of the S-DVD. In order to change the actually used objective lens from the objective lens 212 to the objective lens 213 or from the objective lens 213 to the objective lens 212, an axis sliding and rotating actuator such as that shown in FIG. 18 in which the two objective lenses 212 and 213 are loaded is used, which actuator is used also for the tracking operation. In FIG. 18, a pair of magnets 41 for focusing and a pair of magnets 42 for tracking are arranged orthogonally outside of the axis sliding and rotating actuator which holds the objective lenses 212 and 213.

The infrared laser light and blue laser light are focused by the objective lens 212 (213), pass through the transparent polycarbonate substrate and incident on the information recording plane of the optical recording medium 215 (216). When recording/reproducing is performed on the CD 215, the objective lens 212 is used, and the infrared laser light is focused on the information recording plane (on focus), but the blue laser light is not focused on the information recording plane. When recording/reproducing is performed on the S-DVD 216, the objective lens 213 is used, and the blue laser light is focused on the information recording plane, but the infrared laser light is not focused on the information recording plane.

Figure 19:
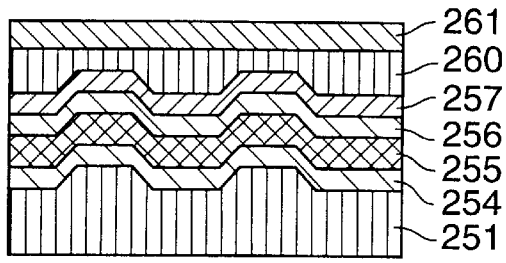
FIG. 19 shows a sectional view showing an arrangement of a phase-change-type optical disc.

The optical recording medium 215 (216) will now be described. As the optical recording medium 215 (216), any one of a ROM-type optical disc for-which only reproducing can be performed, a write-once-type organic-pigment optical disc, and a phase-change-type optical disc on which recording/reproducing can be performed repeatedly can be used. FIG. 19 shows an elevational sectional view of the phase-change-type optical disc. A lower protection layer 254 is deposited on a polycarbonate substrate 251, a recording layer 255 is laminated on the layer 254, the recording layer 255 is caused to be sandwiched by the lower protection layer 254 and an upper protection layer 256, and, then, Al is laminated as a reflection layer 257. On the reflection layer 257, an environmental protection layer 260 and a label print layer 261 are laminated. The material of the recording layer used in a CD-RW is Ag—In—Sb—Te. The phase-change-type optical disc is a medium on which recording/reproducing of information is performed using difference in optical constant between the crystalline state and the amorphous state. Originally the optical recording medium is in the crystalline state. When light is incident on the optical recording medium, the temperature of the crystal exceeds the melting point at the incident position. Then, when emitting of the light is stopped and the optical recording medium is rapidly cooled at this position, the optical recording medium enters the amorphous state at this position. Thus, a mark in the amorphous state is obtained at this position. Using this record mark, reproducing of information is performed. When light is incident on the optical recording medium with power which is half of that at the time of recording, the optical recording medium changes from the amorphous state into the crystalline state, and, as a result, the record mark is erased.

Figure 20:
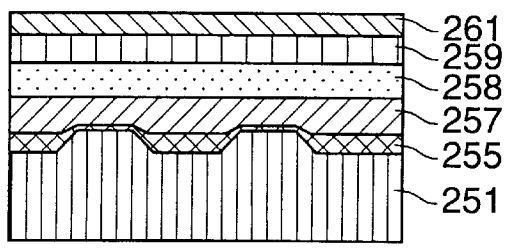
FIG. 20 shows a sectional view showing an arrangement of a write-once-type organic-pigment optical recording medium.

FIG. 20 shows an elevational sectional view of the write-once-type organic-pigment optical recording medium. Organic pigment is deposited, through spin coating, on a polycarbonate substrate 251 as a recording layer 255. Then, a reflection layer 57 and an adhesive layer 258 are laminated. On the adhesive layer 258, an upper substrate 257 and a label print layer 261 are laminated. In such an organic-pigment optical disc, pits are formed as a result of laser light being incident. Then, information-is reproduced as a result of detecting presence/absence of the pits.

The infrared laser light and blue laser light reflected by the optical recording medium 215 (216) pass through the objective lens 212 or 213 so as to become parallel light, and pass through the quarter-wave plate 211 so as to be converted from the circular polarized light into the linearly polarized light. Then, the light path of the infrared laser light and blue laser light is bent by 90degrees by the polarization beam splitter 208, and the infrared laser light and blue laser light are incident on the dichroic mirror 219 (a wavelength splitting element, acting as a light-path splitting element).

The dichroic mirror 219 will now be described.

The reflected infrared laser light and the reflected blue laser light, the light path of which has been bent by 90 degrees by the polarization beam splitter 208, are incident on the separate detectors 233 and 234, respectively, through the dichroic mirror 219.

Figure 21:
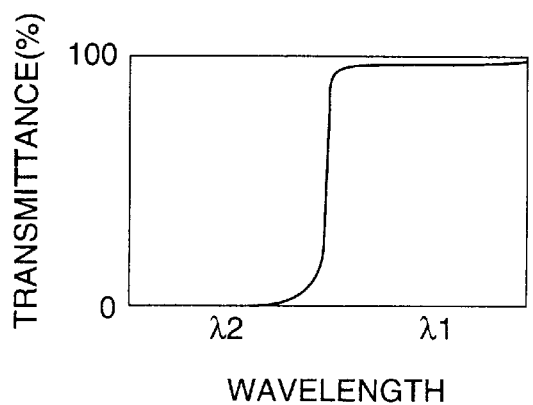
FIG. 21 shows characteristics of a dichroic mirror.

The dichroic mirror 219 has characteristics such as those shown in FIG. 21, for example. As a result, the reflected infrared laser light is not reflected but is transmitted by the dichroic mirror 219 as it is, and is incident on the detector 233. The reflected blue laser light is reflected by the dichroic mirror 219 so that the light path thereof is bent by 90 degrees, and is incident on the detector 234. In front of the detectors 233 and 234, the detection lenses 225 and 226, and the cylindrical lenses 228 and 229 are provided, respectively. Each of the detection lenses 225 and 226, and the cylindrical lenses 228 and 229 acts as astigmatism means, and, thereby, astigmatism is given to the light which passes therethrough.

Figure 22:
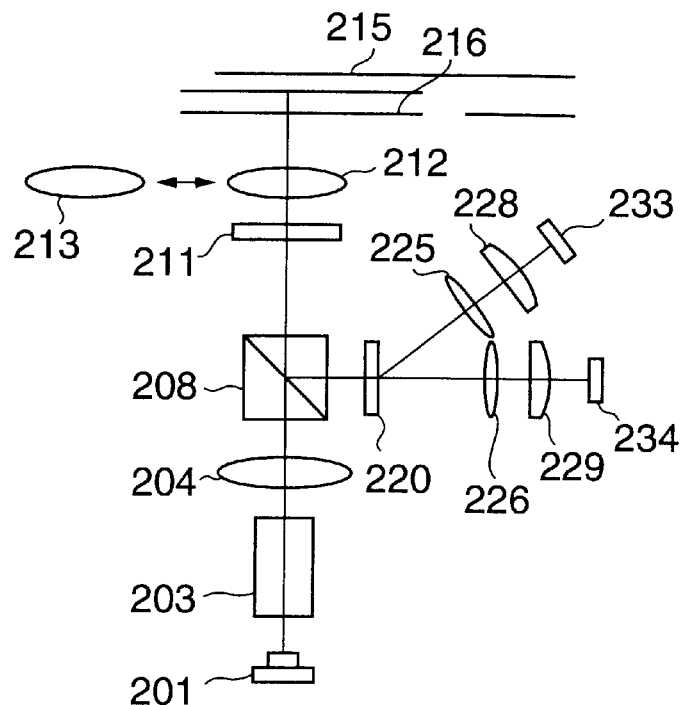
FIG. 22 shows a general arrangement of a variation of the eighth embodiment, in which variation a wavelength selecting hologram is used.

In the eighth embodiment, the dichroic mirror 219 is used as the wavelength splitting element. However, it is also possible to use a wavelength selecting hologram, in which diffraction is utilized, as the wavelength selecting means. FIG. 22 shows a general arrangement of an optical-pickup device, in a variation of the eighth embodiment, in which the wavelength selecting hologram 220 is used. In this case, the reflected infrared laser light is diffracted by the wavelength selecting hologram 220 so as to be incident on the detector 233. The reflected blue laser light is not diffracted but transmitted by the wavelength selecting hologram 220 as it is so as to be incident on the detector 234.

Each of the detectors 233 and 234 has a four-piece arrangement. When recording/reproducing is performed on the CD, the detector 233 detects the RF signal, focus signal and tracking signal of the CD 215. When recording/reproducing is performed on the S-DVD, the detector 234 detects the RF signal, focus signal and tracking signal of the S-DVD 216. As a method for detecting the focus signal, the astigmatic method is known. As a method for detecting the tracking signal, the push-pull method or the like is known.

In the eighth embodiment, the objective lens 212 for the CD and the objective lens 213 for the S-DVD are provided. However, it is also possible that only the single objective lens 213 designed for the S-DVD is provided, and, for performing recording/reproducing on the CD, a wavelength selecting aperture, which effectively limits the numerical aperture of the objective lens 213, is provided.

Figure 23:
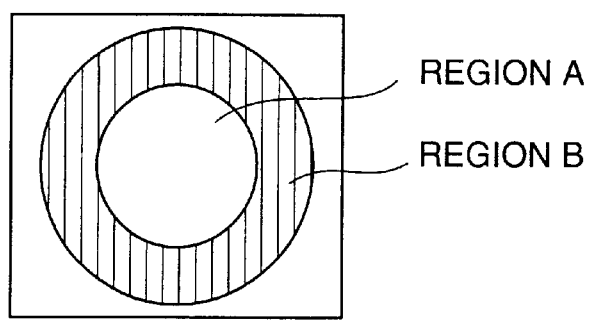
FIG. 23 shows a wavelength selecting aperture.

The case where this method in which only the single objective lens 213 is provided is used will now be described. The objective lens 213 has the predetermined numerical aperture (larger than the numerical aperture of the objective lens 212 designed for the thickness of the substrate of the CD) which is designed for the thickness of the substrate of the S-DVD. In front of the objective lens 213, the wavelength selecting aperture having a shape such as that shown in FIG. 23 is located. The wavelength selecting aperture acts as a numerical-aperture limiting element. In FIG. 23, the region A is a region, at which the wavelength selecting aperture transmits the infrared laser light and also transmits the blue laser light. The region B is a region, at which the wavelength selecting aperture reflects the infrared laser light but transmits the blue laser light. The wavelength selecting aperture has a function of reflecting the infrared laser light partially so as to prevent the infrared laser light from being incident on the objective lens 213 at the outer circumferential portion thereof so that the infrared laser light can be focused on the optical recording medium 215, the thickness of the substrate of which is 1.2 mm. In this case, the wavelength selecting aperture is designed so that the effective numerical aperture of the objective lens 213 having the numerical aperture for the S-DVD becomes 0.5 for the infrared laser light as a result of providing the wavelength selecting aperture.

Figure 24:
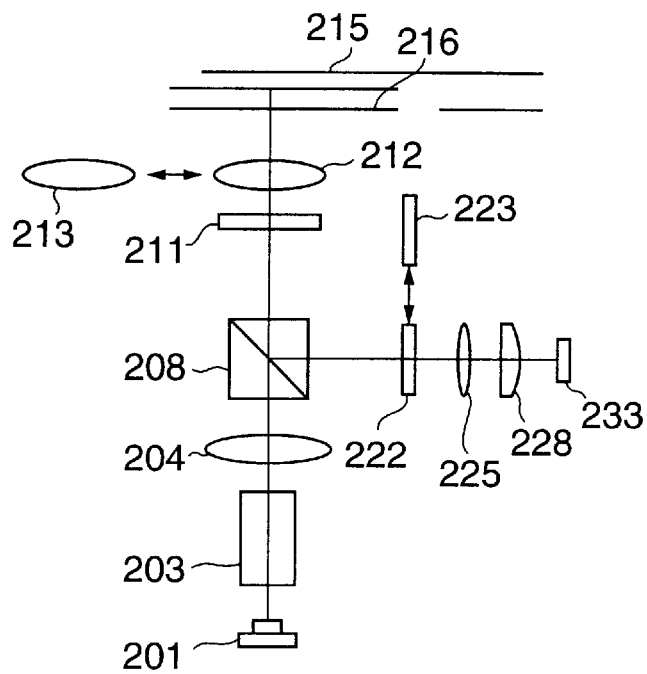
FIG. 24 shows a general arrangement of an optical-pickup device in a ninth embodiment of the present invention.

FIG. 24 shows a general arrangement of a ninth embodiment of an optical-pickup device according to the present invention.

In the above-described eighth embodiment, the reflected infrared laser light and reflected blue laser light from the optical recording medium 215 (216) are received by the separate detectors 233 and 234, respectively. However, for the sake of miniaturization of the device and simplification of adjustment of the device, it is preferable that only the single detector is provided. Therefore, in the ninth embodiment, only the single detector is provided.

In the optical-pickup device in the ninth embodiment shown in FIG. 24, the detection optical system (the detection lens 225, cylindrical lens 228 and detector 233) which is used for detecting the reflected infrared laser light is also used in common as the detection optical system (the detection lens 226, cylindrical lens 229 and detector 234), which is used for detecting the reflected blue laser light in the optical-pickup device in the eighth embodiment shown in FIG. 16. Further, in the optical-pickup device in the ninth embodiment shown in FIG. 24, the dichroic mirror 219, provided as the wavelength splitting element in the optical-pickup device in the eighth embodiment shown in FIG. 16, is replaced by wavelength selecting filter 222 (223). The other components of the optical-pickup device in the ninth embodiment are the same as those of the optical-pickup device in the eighth embodiment, the same reference numerals are given to the components having the same functions, and the duplicate description is omitted.

The infrared laser light emitted by the semiconductor laser 201 is incident on the wavelength-converting element 203. From the other end surface of the wavelength-converting element 203, the infrared laser light of the original wavelength and the blue laser light, the wavelength of which is half of the wavelength of the infrared laser light, are emitted. The infrared laser light and blue laser light emitted from the wavelength-converting element 203 are collimated by the collimator lens 204. The thus-obtained light is transmitted by the polarization beam splitter 208 as it is, so that the light is incident on the optical recording medium 215 (216). The light reflected by the optical recording medium 215 (216) is reflected by the polarization plane of the polarization beam splitter 208, and is incident on the detection optical system including the detector 233. The infrared laser light and blue laser light emitted from the wavelength-converting element 203 are incident on the quarter-wave plate 211. When the infrared laser light and blue laser light pass through the quarter-wave plate 211, the vibration planes thereof are rotated by ¼ wavelengths, respectively, and the infrared laser light and blue laser light are incident on the objective lens 212 (211) which focuses the infrared laser light and blue laser light on the information recording plane of the optical recording medium 215 (216).

In the ninth embodiment, the objective lens 212 for the CD and the objective lens 213 for the S-DVD are provided (a two-lens system). However, as described above in the description of the eighth embodiment, it is also possible that only the single objective lens 213 designed for the S-DVD is provided, and, for performing recording/reproducing on the CD, the wavelength selecting aperture, which effectively limits the numerical aperture of the objective lens 213, is provided (a single-lens aperture-limiting system).

The infrared laser light and blue laser light are focused by the objective lens 212 (213), pass through the transparent polycarbonate substrate and incident on the information recording plane of the optical recording medium 215 (216). When recording/reproducing is performed on the CD 215, the objective lens 212 is used, and the infrared laser light is focused on the information recording plane (on focus), but the blue laser light is not focused on the information recording plane. When recording/reproducing is performed on the S-DVD 216, the objective lens 213 is used, and the blue laser light is focused on the information recording plane, but the infrared laser light is not focused on the information recording plane. As described in the description of the eight embodiment, the phase-change-type optical disc, the organic-pigment optical disc, or the like may be used as the optical recording medium 215 (216).

The infrared laser light and blue laser light reflected by the optical recording medium 215 (216) pass through the objective lens 212 (213) so as to become parallel light, and pass through the quarter-wave plate 211 so as to be converted from the circular polarized light into the linearly polarized light. Then, the light path of the infrared laser light and blue laser light is bent by 90 degrees by the polarization beam splitter 208. Then, one of the infrared laser light and blue laser light is selected by the wavelength selecting filter 222 (223), and is incident on the detector 233. The detection lens 225 and cylindrical lens 228 are provided between the wavelength selecting filter 222 (223) and the detector 233. Each of the detection lens 225 and cylindrical lens 228 acts as astigmatism means, and, thereby, astigmatism is given to the light which passes therethrough.

The wavelength selecting filters 222 and 223 will now be described.

The reflected infrared laser light and reflected infrared laser light, the light path of which has been bent by 90 degrees by the polarization beam splitter 208, are incident on the wavelength selecting filter 222 (223). The wavelength selecting filters 222 and 223 are used for selecting one of the infrared laser light and blue laser light, and cause the thus-selected laser light to be incident on the detector 233.

Figure 25:
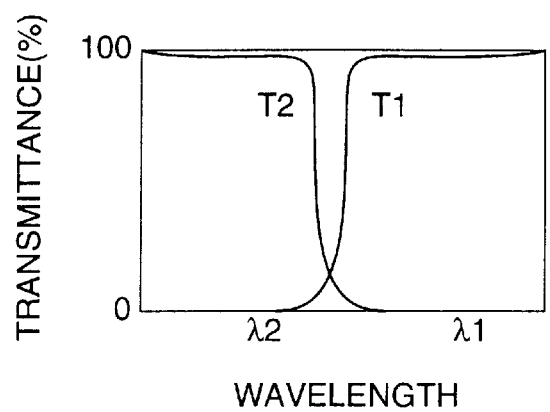
FIG. 25 shows characteristics of wavelength-selecting filters.

The wavelength selecting filters 222 and 223 have characteristics such as those shown in FIG. 25, for example. A mechanism is provided, by which mechanism it is possible to select one of the following two states: a first state in which one of these selecting filters 222 and 223 is mechanically inserted into the light path while the other thereof is mechanically removed from the light path; and a second state in which the other of these selecting filters 222 and 223 is mechanically inserted into the light path while the one thereof is mechanically removed from the light path. The wavelength selecting filter 222 transmits the infrared laser light but does not transmit the blue laser light. The wavelength selecting filter 223 transmits the blue laser light but does not transmit the infrared laser light. In FIG. 25, T1 represents the transmittance of the wavelength selecting filter 222, and T2 represents the transmittance of the wavelength selecting filter 223. Therefore, it can be seen that the laser light of the first wavelength is transmitted by the wavelength selecting filter 222, the transmittance of which is T1, but is not transmitted by the wavelength selecting filter 223, the transmittance of which is T2, and, the laser light of the second wavelength is transmitted by the wavelength selecting filter 223, the transmittance of which is T2, but is not transmitted by the wavelength selecting filter 222, the transmittance of which is T1. When recording/reproducing is performed on the CD, the wavelength selecting filter 222 which transmits only the infrared laser light is inserted into the light path. When recording/reproducing is performed on the S-DVD, the wavelength selecting filter 223 which transmits only the blue laser light is inserted into the light path. As a result, any one of the infrared laser light and blue laser light, selected by the wavelength selecting filter 222 or 223, is incident on the detector 233.

The position of the wavelength selecting filter 222 (223) is not limited to the above-mentioned position. The position of the wavelength selecting filter 222 (223) may be any position in the light path between the wavelength-converting element 203 and the detector 233. For example, when the wavelength selecting filter 222 (223) is located in the light path between the wavelength-converting element 203 and the optical recording medium 215 (216), any one of the infrared laser light and blue laser light, which is used for recording/reproducing, is selectively incident on the optical recording medium 215 (216), and the light reflected thereby is detected by the detector 233.

FIGS. 26–29 show a principle of tilt detection in a tenth embodiment of an optical-pickup device according to the present invention.

The shape of a spot formed on the information recording plane of the optical recording medium as a result of focusing is distorted due to the coma occurring due to a tilt of the substrate. The coma is proportional to the cube of the numerical aperture (NA), and is inversely proportional to the wavelength. In comparison to the fact that the NA of the optical system for the CD is 0.5, the NA of the optical system for the S-DVD is larger. Further, the wavelength of the laser light used for performing recording/reproducing on the S-DVD is half of the wavelength of the laser light used for performing recording/reproducing on the CD. Therefore, in order to control the coma, the thickness of the substrate in the S-DVD is thinner than the thickness of the substrate in the CD. However, the various margins (the defocus, the control error and so forth) are reduced due to increase in the storage capacity, the allowable amount of the tilt of the disc substrate is small. In order to obtain the best RF signal by causing the objective lens of the optical pickup to face the optical disc in a condition where the axis of the objective lens is perpendicular to the disc substrate although the disc substrate tilts, it is necessary to perform the tilt-servo control. In order to perform the tilt-servo control, the tilt sensor which detects the tilt of the disc substrate is needed. In the related art, a special arrangement of the tilt sensor is provided.

In each of the above-described eighth embodiment, variation of the eighth embodiment, and ninth embodiment, the laser light which is one not used for recording/reproducing, that is, the blue laser light at the time recording/reproducing is performed on the CD or the infrared laser light at the time recording/reproducing is performed on the S-DVD is not used. In the tenth embodiment, the laser light, which is one not used for recording/reproducing in each of the above-described eighth embodiment, variation of the eighth embodiment, and ninth embodiment, is used for the tilt detection. As a result, it is possible to detect the best RF signal without additionally providing a special tilt detecting member. Because the general arrangement of the optical-pickup device in the tenth embodiment may be completely the same as the general arrangement of the optical-pickup device in either the eighth embodiment shown in FIG. 16 or the variation of the eight embodiment shown in FIG. 22, the duplicate description is omitted.

The principle of the tilt detection in the tenth embodiment will now be described.

In FIGS. 26–29, because these figures are those for illustrating the principle, the optically strict ray path is not shown, and showing of the optical components which are provided on the way to the detector is omitted.

Figure 26:
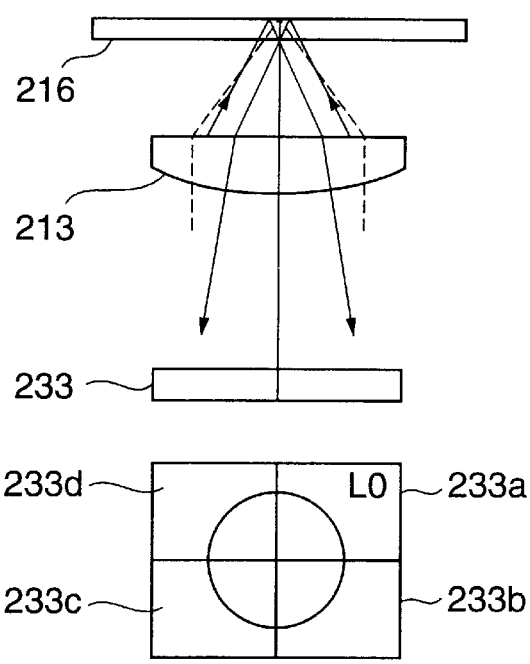
FIGS. 26, 27, 28 and 29 show a principle of tilt detection in an optical-pickup device in a tenth embodiment of the present invention.
Figure 27:
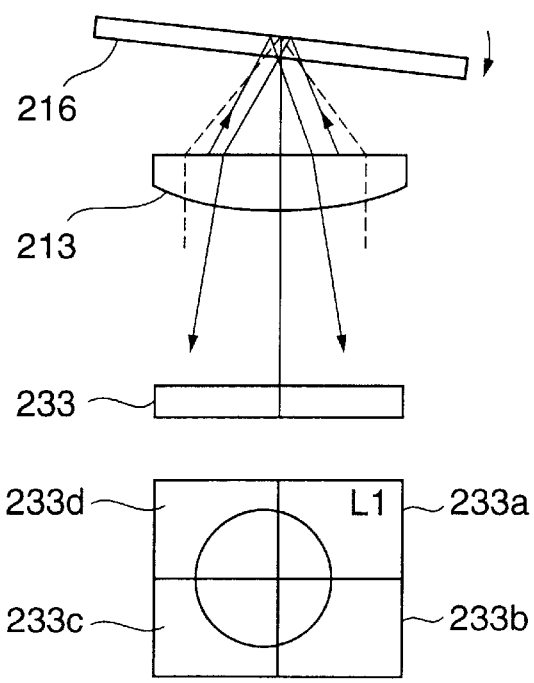

FIGS. 26 and 27 show a case where recording/reproducing is performed on the S-DVD 216. In this case, the blue laser light (indicated by the broken lines in FIGS. 26 and 27) is focused on the information recording plane of the S-DVD 216, whereas the infrared laser light (indicated by the solid lines in FIGS. 26 and 27) is not focused on the information recording plane of the S-DVD 216. In FIG. 26, the position at which the infrared laser light reflected by the S-DVD 216 is incident on the detector 233 is the position L0. When a relative tilt develops between the objective lens 213 and the S-DVD 216, the position at which the infrared laser light, which is not used for recording/reproducing, reflected by the S-DVD 216 is incident on the detector changes. In this case, the position at which the infrared laser light reflected by the S-DVD 216 is incident on the detector 233 is the position L1, shown in FIG. 27, which is different from the position L0. The outputs of four light-receiving elements 233a, 233b, 233c and 233d which constitute the detector 233 are referred to as Pa, Pb, Pc and Pd, respectively. The output difference (Pa+Pb)−(Pc+Pd) is obtained. When there is no tilt as shown in FIG. 26, this output difference is zero. However, when there is a tilt as shown in FIG. 27, the output (Pa+Pb) decreases and the output (Pc+Pd) increases. Accordingly, the output difference (Pa+Pb)−(Pc+Pd) of the detector 233 consisting of the four light-receiving elements is a signal depending on the tilt amount. Thus, the tilt can be detected.

Figure 28:
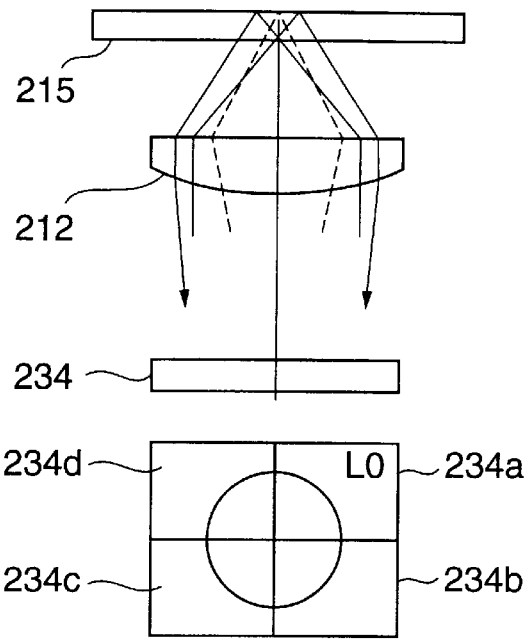
Figure 29:
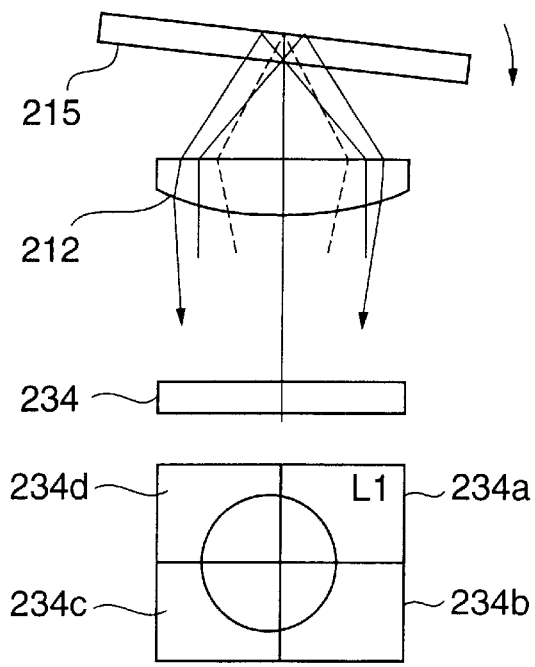

In contrast to the case shown in FIGS. 26 and 27, FIGS. 28 and 29 shows a case where recording/reproducing is performed on the CD 115. In this, case, the infrared laser light (indicated by the broken lines in FIGS. 28 and 29), used for performing recording/reproducing on the CD 115, is focused on the information recording plane of the CD 115. At this time, the blue laser light (indicated by the solid lines in FIGS. 28 and 29), which is simultaneously incident on and is reflected by the CD 115, has the distribution, on the detector 234, which is right-and-left symmetrical with respect to the center line of the detector 234, as shown in FIG. 28, when there is no tilt. In this case, the position at which the blue laser light reflected by the CD 115 is incident on the detector 234 is the position L0 shown in FIG. 28. When a tilt develops, as shown in FIG. 29, similarly to the case of FIGS. 26 and 27, the outputs of the detector 234 consisting of the four light-receiving elements come to be out of balance. In this case, the position at which the blue laser light reflected by the CD 215 is incident on the detector 234 is the position L1, shown in FIG. 29, which is different from the position L0. Accordingly, similarly to the case of FIGS. 26 and 27, the tilt can be detected from the difference between the outputs of the respective four light-receiving elements of the detector 234.

Figure 30:
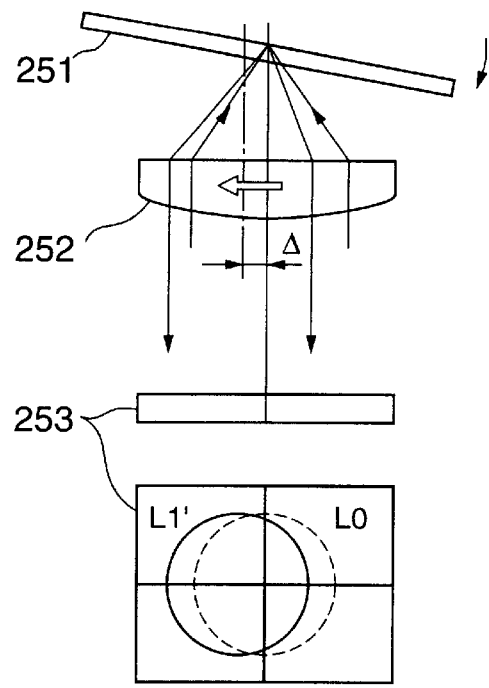
FIG. 30 shows a case where an optical-axis deviation exists.
Figure 31:
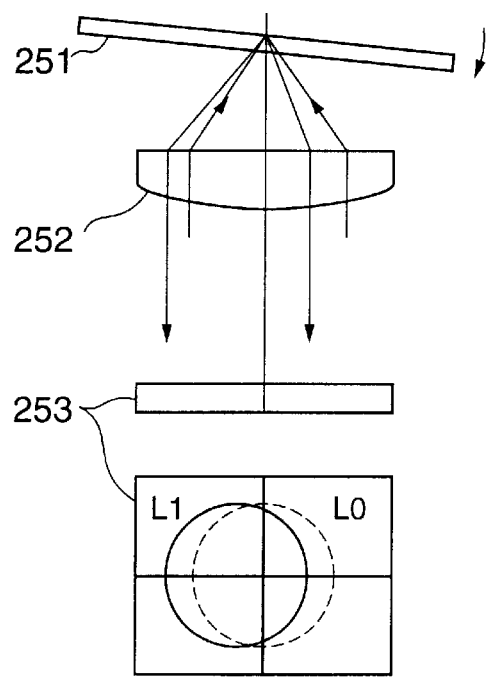
FIG. 31 shows a case where no optical-axis deviation exists.

In the above description of the tilt detection, the case where no optical-axis deviation (deviation of light path developing between the ideal optical axis and the optical axis of the objective lens at the time of tracking) exists is described. Generally speaking, when there is the optical-axis deviation, the offset due to the optical-axis deviation develops, and, as a result, the error included in the tilt signal increases. In an arrangement in which the optical-axis deviation exists, as shown in FIG. 30, because it is not possible to determine whether the offset amount included in the tilt signal is one which develops due the tilt or one which develops due to the optical-axis deviation, a countermeasure such as to provide an optical-axis-deviation detecting member is necessary when the optical-axis deviation is large. However, in the case where the arrangement in which no optical-axis deviation exists is used, as shown in FIG. 31, as in the tenth embodiment, because the offset amount is determined only by the tilt, it is possible to perform the tilt detection accurately. As an optical system in which no optical-axis deviation exists, an optical system in which a method in which tracking is performed with the entire optical system is used or the like can be used. When a relative tilt develops between an objective lens 252 and a substrate 251, as shown in FIG. 30, the position at which the laser light reflected by the substrate 251 is incident on a detector 253 changes from the position L0 to the position L1. However, in this case, also an optical-axis deviation develops in the objective lens 252 and the substrate 251. Thereby, the position at which the laser light reflected by the substrate 251 is incident on the detector 253 further changes from the position L1 to the position L1'. In contrast thereto, when only a relative tilt develops between the objective lens 252 and the substrate 251, as shown in FIG. 31, the position at which the laser light reflected by the substrate 251 is incident on a detector 253 changes only from the position L0 to the position L1.

Figure 32:
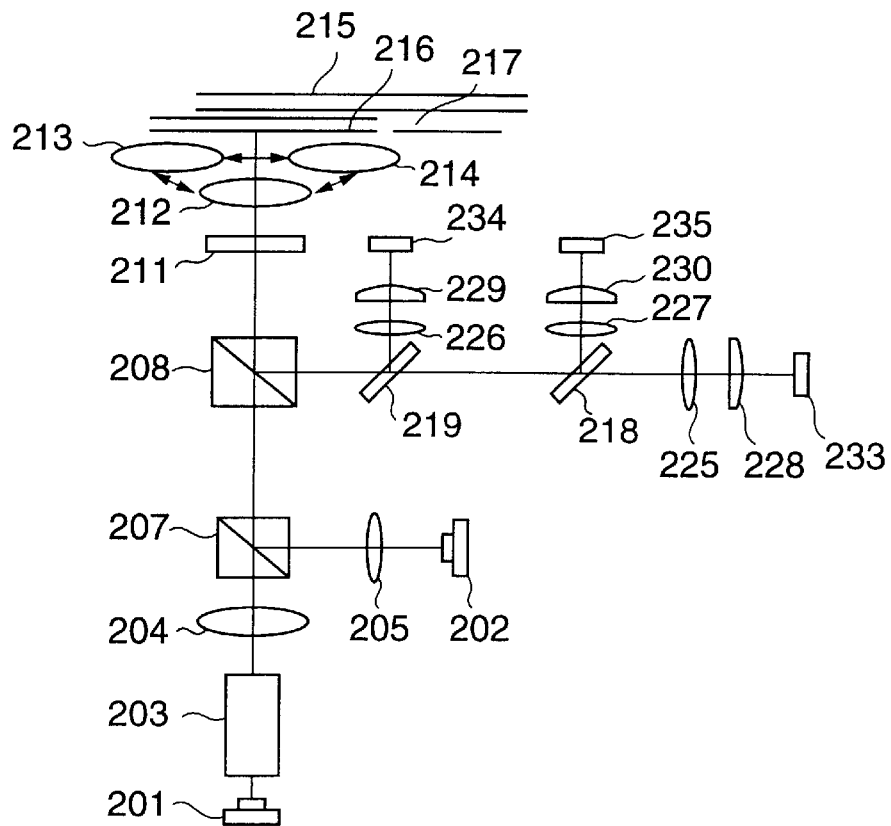
FIG. 32 shows a general arrangement of an optical-pickup device in an eleventh embodiment of the present invention.

FIG. 32 shows a general arrangement of an eleventh embodiment of an optical-pickup device according to the present invention.

In FIG. 32, the same reference numerals are given to the components having the same functions as those of the components in the optical-pickup devices shown in FIGS. 16 and 22, and the duplicate description is omitted.

Each or the above-described eighth, ninth and tenth embodiments is the optical-pickup device which can perform recording/reproducing on the currently-used CD and also on the S-DVD which will be used in future. However, at the present, the DVD having the storage capacity which is intermediate between the those of the CD and S-DVD has been in common use. Therefore, it is preferable that each the above-described eighth, ninth and tenth embodiments is an optical-pickup device which can perform recording/reproducing on any one of the three types of optical recording media including the DVD.

The eleventh embodiment, which will now be described, is an optical-pickup device which can perform recording/reproducing any one of on the CD, DVD and S-DVD. With reference to FIG. 32, the recording/reproducing optical system of the optical-pickup device in the eleventh embodiment will now be described.

Figure 33:
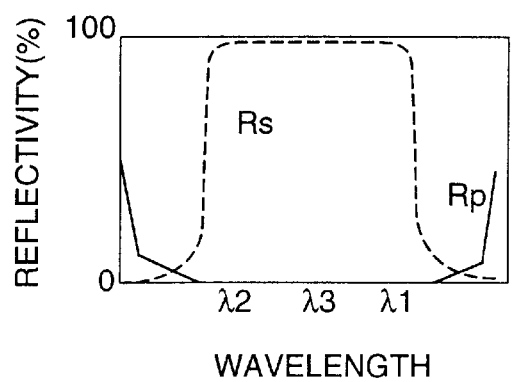
FIG. 33 shows characteristics of a polarization beam splitter.

The optical-pickup device in the eleventh embodiment is obtained as a result of adding, to the optical-pickup device in the eighth embodiment shown in FIG. 16, a red semiconductor laser 202 for a DVD 217 (optical recording medium), a collimator lens 205 which causes red laser light to become parallel light, a 3-wavelength synthesis prism 207 which reflects the laser light from the red semiconductor laser 202 and bends the light path thereof by 90 degrees so as to cause this laser light to be incident on the optical recording medium 215 (216, 217), and, also, transmits the blue laser light and infrared laser light as they are so as to cause the blue laser light and infrared laser light to be incident on the optical recording medium 215 (216, 217), an objective lens 214 which focuses the red laser light on the optical recording medium 217, a wavelength splitting element 218 (acting as a light-path splitting element) which causes the red laser light reflected by the optical recording medium 217 to be incident on a detection optical system which detects the reflected red laser light, a detection lens 227, a cylindrical lens 230 and a detector 235 (the detection lens 227, cylindrical lens 230 and detector 235 constitute the detection optical system for the red laser light). Further, in the eleventh embodiment, the quarter-wave plate 211 can rotate the vibration planes of all the above-mentioned infrared laser light, red laser light and blue laser. light by ¼ wavelengths, respectively. The polarization beam splitter 208 transmits, approximately without reflecting, the p-polarized light, and has high reflectivity for the s-polarized light, for all the three wavelengths of the infrared laser light, blue laser light and red laser light, as shown in FIG. 33. In FIG. 33, Rp represents the reflectivity of the polarization beam splitter 208 for the p-polarized light, and Rs represents the reflectivity thereof for the s-polarized light. It can be seen from FIG. 33 that Rs is approximately 100% for all the band including the first, second and third wavelengths, whereas Rp is approximately 0% for all the band including the first, second and third wavelengths. Therefore, the s-polarized light is approximately completely reflected by the polarization beam splitter 208 for all the three wavelengths of the infrared laser light, blue laser light and red laser light, whereas the p-polarized light is approximately completely transmitted by the polarization beam splitter 208 for all the three wavelengths of the infrared laser light, blue laser light and red laser light.

Figure 34:
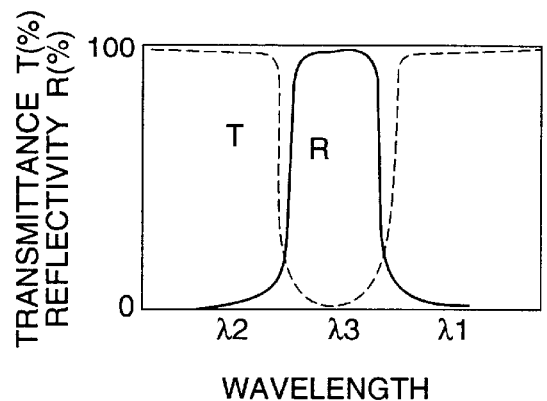
FIG. 34 shows characteristics of a 3-wavelength synthesis prism.

As shown in FIG. 34, the 3-wavelength synthesis prism 207 has the reflectivity which is approximately 0% for the infrared laser light and blue laser light, but has the high reflectivity for the red laser light. In FIG. 34, T represents the transmittance of the 3-wavelength synthesis prism 207, and R represents the reflectivity of the 3-wavelength synthesis prism 207. The 3-wavelength synthesis prism 207 has the transmittance which is approximately 0% for the red laser light of the third wavelength, but has the transmittance approximately 100% for the infrared laser light of the first wavelength and the blue laser light of the second wavelength. In contrast to this, the 3-wavelength synthesis prism 207 has the reflectivity which is approximately 100% for the red laser light of the third wavelength, but has the reflectivity approximately 0% for the infrared laser light of the first wavelength and the blue laser light of the second wavelength.

In order that the quarter-wave plate 211 can convert all the blue laser light (the second wavelength: $\lambda 2$), infrared laser light (the first wavelength: $\lambda 1$) and red laser light (the third wavelength: $\lambda 3$) from the linearly polarized light into the circular polarized light or from the circular polarized light into the linearly polarized light, the crystal structure of the quarter-wave plate is arranged so that, in a thickness 't', the phase differences between the ordinary rays (the refractive indexes: no) and the extraordinary rays (the refractive indexes: no) are ¼ of $\lambda 2$, $\lambda 1$ and $\lambda 3$, respectively. In other words, the crystal which fulfills the following equations (3), (4) and (5) is selected:

$$\Delta n1 \times t = \{(2p+1)/4\} \times (\text{first wavelength}) \ (p=0, 1, 2, \ldots ) \quad (3);$$

$$\Delta n2 \times t = \{(2q+1)/4\} \times (\text{second wavelength}) \ (q=0, 1, 2, \ldots ) \quad (4);$$

and $$\Delta n3 \times t = \{(2r+1)/4\} \times (\text{third wavelength}) \ (r=0, 1, 2, \ldots ) \quad (5),$$

where:

$\Delta n1$ represents (no−ne) for the laser light of the first wavelength;

$\Delta n2$ represents (no−ne) for the laser light of the second wavelength;

$\Delta n3$ represents (no−ne) for the laser light of the third wavelength; and

't' represents the thickness of the quarter-wave plate.

The arrangement of the quarter-wave plate 211 is not limited to the above-described arrangement, but it is also possible that three quarter-wave plates are provided for the wavelengths ($\lambda 1$, $\lambda 2$ and $\lambda 3$), respectively, and these quarter-wave plates are mechanically replaceable for the light path, that is, a mechanism is provided, by which mechanism it is possible to select one of the following three states: a first state in which a first one of these quarter-wave plates is mechanically inserted into the light path while the others are mechanically removed from the light path; a second state in which a second one of these quarter-wave plates is mechanically inserted into the light path while the others are mechanically removed from the light path; and a third state in which a third one of these quarter-wave plates is mechanically inserted into the light path while the others are mechanically removed from the light path.

Figure 35:
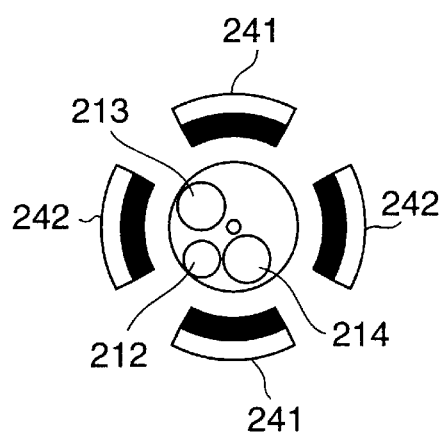
FIG. 35 shows an arrangement of an axis sliding and rotating actuator.

As the objective lenses in the eleventh embodiment, in addition to the above-mentioned objective lenses 212 and 213 in the eighth embodiment shown in FIG. 16, the objective lens 214, having the numerical aperture of 0.6, which is designed for performing recording/reproducing on the DVD 217, the thickness of the substrate of which is 0.6 mm, using the red laser light, is used. In order to change the actually used objective lens from the objective lens 212 to the objective lens 213, from the objective lens 213 to the objective lens 212, from the objective lens 212 to the objective lens 214, from the objective lens 214 to the objective lens 212, from the objective lens 213 to the objective lens 214, or from the objective lens 214 to the objective lens 213, an axis sliding and rotating actuator such as that shown in FIG. 35 in which the three objective lenses 212, 213 and 214 are loaded is used, which actuator is used also for the tracking operation. In FIG. 35, a pair of magnets 241 for focusing and a pair of magnets 242 for tracking are arranged orthogonally outside of the axis sliding and rotating actuator which holds the objective lenses 212, 213 and 214.

An arrangement of objective lenses which can be used in the eleventh embodiment is not limited to the above-described arrangement in which three separate objective lens 212 for the CD, objective lens 213 for the S-DVD and objective lens for the DVD are provided. It is also possible to use an arrangement in which only two objective lenses are provided, and one of them is used for both any two of the CD, S-DVD and DVD in common. In order to use a single objective lens for any two of the CD, S-DVD and DVD in common, a wavelength selecting aperture similar to that shown in FIG. 23 may be used. In this case, the objective lens and the wavelength selecting aperture are designed in accordance with the principle described with reference to FIG. 23. (There is a possibility that the numerical aperture designed for the S-DVD is equal to the numerical aperture designed for the DVD. In this, case, the objective lens 213 for the S-DVD can also be used for the DVD in common without providing a member such as the wavelength selecting aperture.) Further, it is also possible to use an arrangement in which only one objective lenses is provided, and this objective lens is used for all the CD, S-DVD and DVD in common. In the case where only the single objective lens is used for all the CD, S-DVD and DVD in common, this single objective lens has a predetermined numerical aperture (equal to or larger than the numerical aperture of the objective lens 214 designed for the thickness of the substrate of the DVD) which is designed for the thickness of the substrate of the S-DVD.

Figure 36:
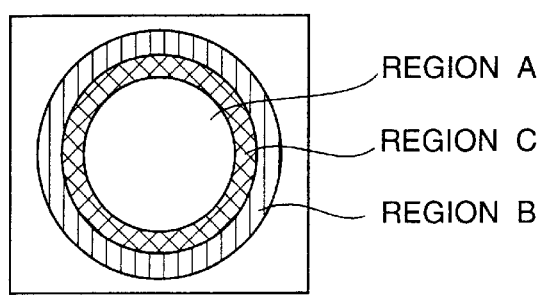
FIG. 36 shows a wavelength selecting aperture.

In the case where only the single objective lens is used for all the CD, S-DVD and DVD in common, a wavelength selecting aperture having a shape such as that shown in FIG. 36 is located in front of this objective lens. The wavelength selecting aperture acts as a numerical-aperture limiting element. In FIG. 36, the region A is a region, at which the wavelength selecting aperture transmits the infrared laser light, transmits the blue laser light and also transmits the red laser light. The region B is a region, at which the wavelength selecting aperture reflects the infrared laser light and also reflects the red laser light but transmits the blue laser light. The region C is a region, at which the wavelength selecting aperture reflects the infrared laser light but transmits the red laser light and also transmits the blue laser light. The wavelength selecting aperture has a function of reflecting the infrared laser light partially so as to prevent the infrared laser light from being incident on the objective lens 213 at the outer circumferential portion thereof so that the infrared laser light can be focused on the optical recording medium 215, the thickness of the substrate of which is 1.2 mm. The wavelength selecting aperture further has a function of reflecting the red laser light partially so as to prevent the red laser light from being incident on the objective lens at the outer circumferential portion thereof so that the red laser light can be focused on the optical recording medium 217, the thickness of the substrate of which is 0.6 mm. In this case, the wavelength selecting aperture is designed so that the effective numerical aperture of the objective lens having the numerical aperture for the S-DVD becomes 0.5 for the infrared laser light and 0.6 for the red laser light as a result of providing the wavelength selecting aperture. As mentioned above, there is the possibility that the numerical aperture designed for the S-DVD is equal to the numerical aperture desired for the DVD. In this, case, the objective lens 213 for the S-DVD can also be used for the DVD in common as mentioned above. Thereby, in this case, instead of providing the wavelength selecting aperture shown in FIG. 36, the wavelength selecting aperture shown in FIG. 23 is used. Thus, as described above by illustrating the wavelength selecting aperture, in order that a single objective lens is used as two or three objective lenses in common, means for limiting the numerical aperture for laser light of any wavelength(s), or aberration correcting means for correcting the spherical aberration developing due to difference in the thickness of the substrate of an optical recording medium is needed.

Further, as the DVD, any recording material can be used as long as it is a recording material in a type in which record marks or pits are formed using change in intensity of an optical beam. For example, the already standardized read-only DVD-ROM, write-once-type DVD-R, or the DVD-RW, the specification of which is the same as that of the DVD-ROM, but which has been proposed as an appendable phase-change-type optical disc.

The detection optical system in the eleventh embodiment will now be described.

In the eleventh embodiment, the light path of the red laser light which has been reflected by the optical recording medium is bent by 90 degrees by the polarization beam splitter 208, and, then, the red laser light is incident on the wavelength splitting element. As the wavelength splitting element for not causing the infrared laser light nor the blue laser light but selectively causing the red laser light to be incident on the detector 235 provided for the red laser light, dichroic mirrors 218 and 219, or a wavelength selecting hologram 221 are (is) used.

Operation or the eleventh embodiment will now be described with reference to FIG. 32.

Figure 37:
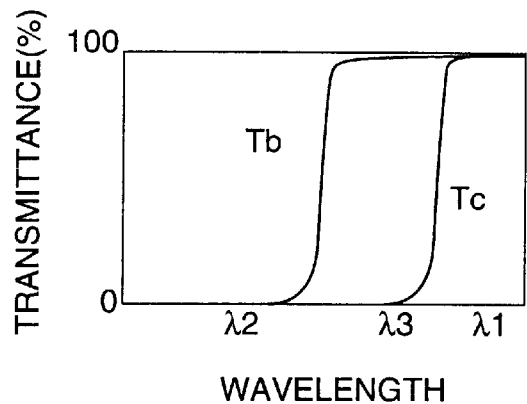
FIG. 37 shows characteristics of dichroic mirrors.

In a case where recording/reproducing is performed on the DVD 217, when the infrared semiconductor laser 201 is not used in particular, the power source is disconnected from the infrared semiconductor laser 201 so as to prevent the infrared semiconductor laser 201 from acting a heat source. The red laser light emitted by the red semiconductor laser 202 is collimated by the collimator lens 204, is reflected by the 3-wavelength synthesis prism 207 so that the light path of the red laser light is bent by 90 degrees, is transmitted by the polarization beam splitter 208, is converted by the quarter-wave plate 211 from the linearly polarized light to the circular polarized light while being transmitted thereby, and is incident on the objective lens 214 provided for the DVD. Then, the red laser light is converged by the objective lens 214, passes through the transparent polycarbonate substrate, and is focused on the information recording plane of the DVD 217. Then, the red laser light is reflected by the DVD 217, is transmitted by the objective lens 214 so as to become parallel light again, and is converted by the quarter-wave plate 211 from the circular polarized light to the linear polarized light while being transmitted thereby. Then, the light path of the red laser light is bent by 90 degree by the polarization beam splitter 208, and the red laser light is incident on the wavelength splitting elements 219 and 218 which act as the light-path splitting elements. In the case where the wavelength splitting elements 219 and 218 are the dichroic mirrors having the characteristics shown in FIG. 37, respectively, only the reflected blue laser light is reflected so that the light path thereof is bent by 90 degrees by the dichroic mirror 219, and is incident on the detector 234. Then, the red laser light is reflected so that the light path thereof is bent by 90 degrees by the dichroic mirror 218, and is incident on the detector 235. In FIG. 37, Tb represents the transmittance of the dichroic mirror 219 and Tc represents the transmittance of the dichroic mirror 218. In front of the detector 235, the detection lens 227 and cylindrical lens 230 are provided. Each of the detection lens 227 and cylindrical lens 230 acts as astigmatism mean, and, thereby, astigmatism is given to the light which passes therethrough. When recording/reproducing is performed on the DVD 217, the detector 235 detects the RF signal, focus signal and tracking signal of the DVD 217.

Figure 38:
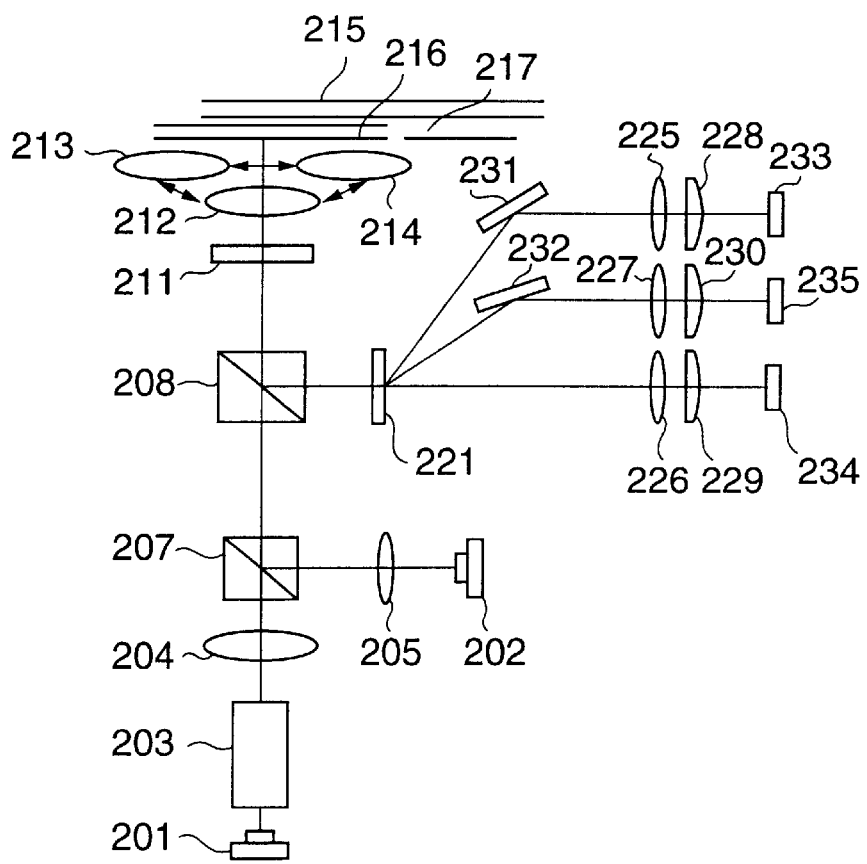
FIG. 38 shows a general arrangement of a variation of the eleventh embodiment, in which variation a wavelength selecting hologram is used.

In the eleventh embodiment, the dichroic mirrors 219 and 218 are used as the wavelength splitting elements. However, as mentioned above, it is also possible to use the wavelength selecting hologram 221, in which diffraction is utilized, as the wavelength splitting element. FIG. 38 shows a general arrangement of an optical-pickup device, in a variation of the eleventh embodiment, in which the wavelength selecting hologram 221 is used. In this case, the reflected infrared laser light is diffracted by the wavelength selecting hologram 221 so as to be the second diffracted light so as to be incident on the detector 233 after being reflected by a mirror 231. The reflected red laser light is diffracted by the wavelength selecting hologram 221 so as to be the first diffracted light so as to be incident on the detector 235 after being reflected by a mirror 232. The reflected blue laser light is not diffracted but transmitted by the wavelength selecting hologram 221 as it is so as to be incident on the detector 234.

Figure 39:
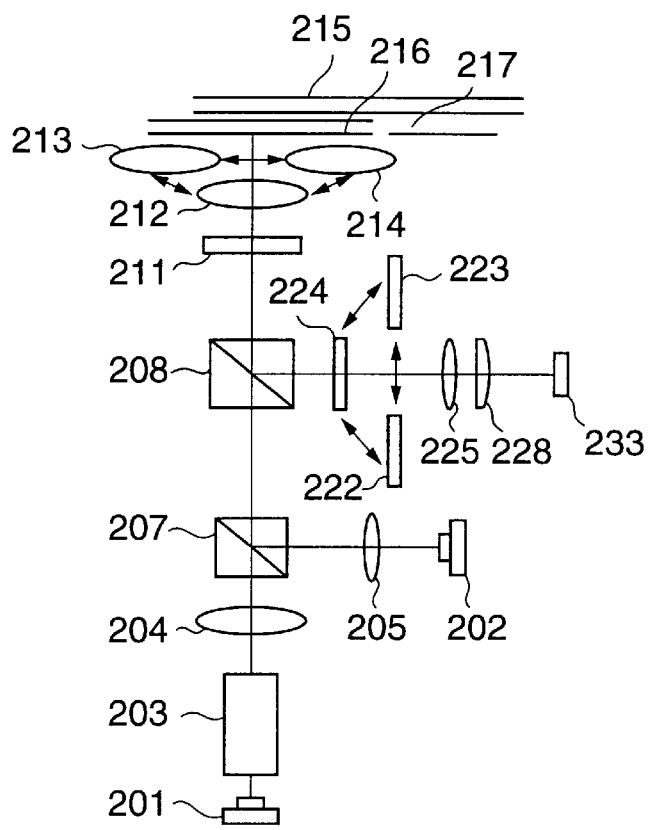
FIG. 39 shows a general arrangement of an optical-pickup device in a twentieth embodiment of the present invention in which only one detector is used.

FIG. 39 shows a general arrangement of a twelfth embodiment of an optical-pickup device according to the present invention.

In the above-described eleventh embodiment, the reflected red laser light, reflected infrared laser light and reflected blue laser light from the optical recording medium 215 (216, 217) are received by the separate detectors 235, 233 and 234, respectively. However, for the sake of miniaturization of the device and simplification of adjustment of the device, it is preferable that only the single detector is provided. Therefore, in the twelfth embodiment, only the single detector is provided.

In the optical-pickup device in the twelfth embodiment shown in FIG. 39, similarly to the optical-pickup device in the ninth embodiment shown in FIG. 24, the detection optical system (the detection lens 225, cylindrical lens 228 and detector 233) which is used for detecting the reflected infrared laser light is also used in common as the detection optical system (the detection lens 226, cylindrical lens 229 and detector 234), which is used for detecting the reflected blue laser light in the optical-pickup device in the eleventh embodiment shown in FIG. 32, and, also, as the detection optical system (the detection lens 227, cylindrical lens 230 and detector 235), which is used for detecting the reflected red laser light in the optical-pickup device in the eleventh embodiment shown in FIG. 32. In the optical-pickup device in the twelfth embodiment shown in FIG. 39, the dichroic mirrors 219 and 218, provided as the wavelength splitting elements in the optical-pickup device in the eleventh embodiment shown in FIG. 32, are replaced by wavelength selecting filter 222 (223, 224). The other components of the optical-pickup device in the twelfth embodiment are the same as those of the optical-pickup device in the eleventh embodiment, the same reference numerals are given to the components having the same functions, and the duplicate description is omitted.

Figure 40:
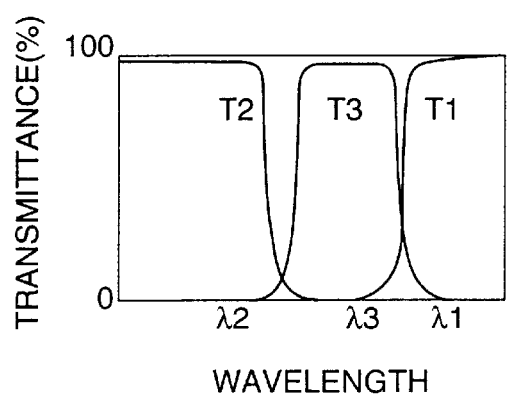
FIG. 40 shows characteristics of wavelength selecting filters.

The wavelength selecting filters 222, 223 and 224 have characteristics such as those shown in FIG. 40, for example. A mechanism is provided, by which mechanism it is possible to select one of the following three states: a first state in which a first one of these selecting filters 222, 223 and 234 is mechanically inserted into the light path while the others are mechanically removed from the light path; a second state in which a second one of these selecting filters 222, 223 and 234 is mechanically inserted into the light path while the others are mechanically removed from the light path; and a third state in which a third one of these selecting filters 222, 223 and 234 is mechanically inserted into the light path while the others are mechanically removed from the light path. The wavelength selecting filter 222 transmits the infrared laser light but does not transmit the blue laser light nor the red laser light. The wavelength selecting filter 223 transmits the blue laser light but does not transmit the infrared laser light or the red laser light. The wavelength selecting filter 224 transmits the red laser light but does not transmit the infrared laser light or the blue laser light. In FIG. 40, T1 represents the transmittance of the wavelength selecting filter 222, T2 represents the transmittance of the wavelength selecting filter 223, and T3 represents the transmittance of the wavelength selecting filter 224. Therefore, it can be seen that the laser light of the first wavelength is transmitted by the wavelength selecting filter 222, the transmittance of which is T1, but is not transmitted by the wavelength selecting filter 223, the transmittance of which is T2, nor by the wavelength selecting filter 224, the transmittance of which is T3, the laser light of the second wavelength is transmitted by the wavelength selecting filter 223, the transmittance of which is T2, but is not transmitted by the wavelength selecting filter 222, the transmittance of which is T1, nor by the wavelength selecting filter 224, the transmittance of which is T3, and the laser light of the third wavelength is transmitted by the wavelength selecting filter 224, the transmittance of which is T3, but is not transmitted by the wavelength selecting filter 222, the transmittance of which is T1, nor by the wavelength selecting filter 223, the transmittance of which is T2. When recording/reproducing is performed on the CD, the wavelength selecting filter 222 which transmits only the infrared laser light is inserted into the light path. When recording/reproducing is performed on the S-DVD, the wavelength selecting filter 223 which transmits only the blue laser light is inserted into the light path. When recording/reproducing is performed on the DVD, the wavelength selecting filter 224 which transmits only the red laser light is inserted into the light path. As a result, any one of the infrared laser light, blue laser light and red laser light, selected by the wavelength selecting filter 222, 223 or 234, is incident on the detector 233. Further, it is also possible that the wavelength selecting filter which only transmits the blue laser light and the wavelength selecting filter which only transmits the infrared filter are provided, and, when only the red laser light is used alone, the infrared semiconductor laser 201 is disconnected from the power source so that both the blue laser light and infrared laser light are not emitted to the optical recording medium. Thereby, it is possible to omit the wavelength selecting filter which only transmits the red laser light.

The position of the wavelength selecting filter 222 (223, 224) is not limited to the above-mentioned position. The position of the wavelength selecting filter 222 (223, 224) may be any position in the light path between the wavelength-converting element 203 and the detector 233. For example, when the wavelength selecting filter 222 (223, 224) is located in the light path between the wavelength-converting element 203 and the optical recording medium 215 (216, 217), any one of the infrared laser light, blue laser light and red laser light, which is used for recording/reproducing, is selectively incident on the optical recording medium 215 (216, 217), and the light reflected thereby is detected by the detector 233.

In each of the above-described eight embodiment, variation of the eight embodiment, ninth embodiment, tenth embodiment, eleventh embodiment, variation of the eleventh embodiment and twelfth embodiment, the wavelength-converting element 203 emits the infrared laser light and blue laser light. However, it is also possible that the wavelength-converting element emits only the infrared laser light when recording/reproducing is performed on the CD.

For example, as a result of the quasi phase matching being not performed in the wavelength-converting element 203 which is the second-harmonic generating element, the blue laser light is canceled out so that the blue laser light is not emitted therefrom. Thereby, it is possible that the wavelength-converting element emits only the infrared laser light. The power of the infrared laser light emitted at this time is larger than the power of the infrared emitted at the time the quasi phase matching is performed. Thereby, it is possible to improve the light use efficiency.

In each of the above-described eleventh embodiment, variation of the eleventh embodiment, and twelfth embodiment, the laser light which is one not used for recording/reproducing, that is, the blue laser light and red laser light at the time recording/reproducing is performed on the CD, the infrared laser light and red laser light at the time recording/reproducing is performed on the S-DVD or the infrared laser light and blue laser light at the time recording and reproducing is performed on the DVD is not used. In a thirteenth embodiment of the present invention, the laser light, which is one not used for recording/reproducing in each of the above-described eleventh embodiment, variation of the eleventh embodiment, and twelfth embodiment, is used for the tilt detection. As a result, it is possible to detect the best RF signal without additionally providing a tilt-detecting member. Because the general arrangement of the optical-pickup device in the thirteenth embodiment may be completely the same as the general arrangement of the optical-pickup device in either the eleventh embodiment shown in FIG. 32 or the variation of the eleventh embodiment shown in FIG. 38, the duplicate description is omitted.

In the thirteenth embodiment, when recording/reproducing is performed on the CD 215, either the blue laser light or the red laser light may be used for the tilt detection. At this time, the laser light (the blue laser light or the red laser light) used for the tilt detection does not focused on the CD 215. Accordingly, as described in the description of the tenth embodiment, when a relative tilt develops between the objective lens 212 and the CD 215, the position at which the laser light (the blue laser light or the red laser light) used for the tilt detection is incident on the detector 234 or 235 for the laser light used for the tilt detection changes. As shown in FIGS. 26–29, this detector consists of four light-receiving elements, and the outputs of these four light-receiving elements are referred to as Pa, Pb, Pc and Pd, respectively. Then, the output difference (Pa+Pb)–(Pc+Pd) is obtained. When there is no tilt, this output difference is zero. However, when there is a tilt, one of the output (Pa+Pb) and the output (Pc+Pd) increases while the other decreases, for example. Accordingly, the output difference (Pa+Pb)–(Pc+Pd) of this detector consisting of the four light-receiving elements is a signal depending on the tilt amount. Thus, the tilt can be detected.

In the thirteenth embodiment, when recording/reproducing is performed on the S-DVD 216, either the infrared laser light or the red laser light may be used for the tilt detection. At this time, the laser light (the infrared laser light or the red laser light) used for the tilt detection does not focused on the S-DVD 216. Accordingly, as described in the description of the tenth embodiment, when a relative tilt develops between the objective lens 213 and the S-DVD 216, the position at which the laser light (the infrared laser light or the red laser light) used for the tilt detection is incident on the detector 233 or 235 for the laser light used for the tilt detection changes. As shown in FIGS. 26–29, this detector consists of four light-receiving elements, and the outputs of these four light-receiving elements are referred to as Pa, Pb, Pc and Pd, respectively. Then, the output difference (Pa+Pb)–(Pc+Pd) is obtained. When there is no tilt, this output difference is zero. However, when there is a tilt, one of the output (Pa+Pb) and the output (Pc+Pd) increases while the other decreases for example. Accordingly, the output difference (Pa+Pb)–(Pc+Pd) of this detector consisting of the four light-receiving elements is a signal depending on the tilt amount. Thus, the tilt can be detected.

In the thirteenth embodiment, when recording/reproducing is performed on the DVD 217, either the infrared laser light or the blue laser light may be used for the tilt detection. At this time, the laser light (the infrared laser light or the blue laser light) used for the tilt detection does not focused on the DVD 217. Accordingly, as described in the description of the tenth embodiment, when a relative tilt develops between the objective lens 214 and the DVD 217, the position at which the laser light (the infrared laser light or the red laser light) used for the tilt detection is incident on the detector 233 or 234 for the laser light used for the tilt detection changes. As shown in FIGS. 26–29, this detector consists of four light-receiving elements, and the outputs of these four light-receiving elements are referred to as Pa, Pb, Pc and Pd, respectively. Then, the output difference (Pa+Pb)–(Pc+Pd) is obtained. When there is no tilt, this output difference is zero. However, when there is a tilt, one of the output (Pa+Pb) and the output (Pc+Pd) increases while the other decreases, for example. Accordingly, the output difference (Pa+Pb)–(Pc+Pd) of this detector consisting of the four light-receiving elements is a signal depending on the tilt amount. Thus, the tilt can be detected.

Figure 41:
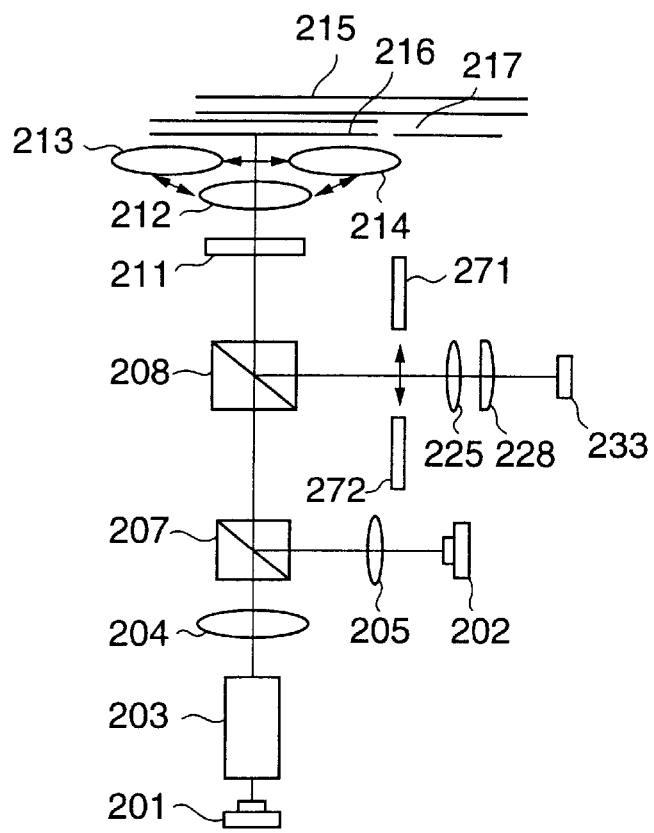
FIG. 41 shows a general arrangement of an optical-pickup device obtained as a result of the optical-pickup device in the twentieth embodiment shown in FIG. 30 being modified so that the wavelength selecting filters are replaced by other wavelength selecting filters.
Figure 42:
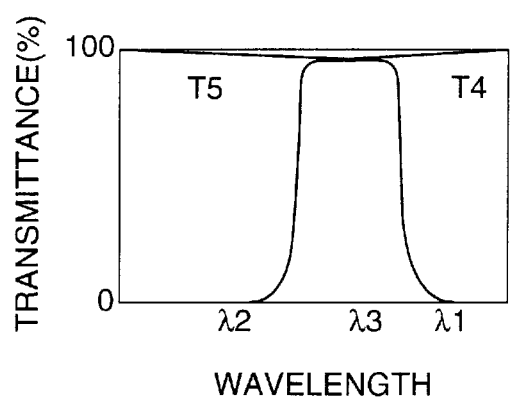
FIG. 42 shows characteristics of wavelength selecting filters used in the arrangement shown in FIG. 41.

Further, also in the case where, as in the above-described twelfth embodiment, the optical system in which the wavelength selecting filters are used for selectively detecting any of the infrared laser light, the blue laser light and the red laser light is used, the tilt detection can be performed, by the following arrangement, for example. At the time of the tilt detection, the set of wavelength selecting filters 222, 223 and 224 are replaced by another set of wavelength selecting filters 271 and 272, having the characteristics shown in FIG. 42, as shown in FIG. 41, in this example. In FIG. 42, T4 shows the transmittance of the wavelength selecting filter 271, and T5 shows the wavelength selecting filter 272. As it can be seen from FIG. 42, the wavelength selecting filter 271 transmits the infrared laser light having the first wavelength and the red laser light having the third wavelength but does not transmit the blue laser light having the second wavelength. Further, the wavelength selecting filter 272 transmits the blue laser light having the second wavelength and the red laser light having the third wavelength but does not transmit the infrared laser light having the first wavelength. A mechanism is provided, by which mechanism it is possible to select one of the following two states: a first state in which one of these wavelength selecting filters 271 and 272 is mechanically inserted into the light path while the other is mechanically removed from the light path; and a second state in which the other of these wavelength selecting filter is mechanically inserted into the light path while the one is mechanically removed from the light path.

When recording/reproducing is performed on the CD 215, the wavelength selecting filter 271 is used. Because the wavelength selecting filter 271 transmits the infrared laser light and red laser light, the red laser light is used for the tilt detection while the infrared laser light is used for recording/reproducing. (Instead of using the wavelength selecting filter 271, it is also possible that, as a result of the quasi phase matching being not performed in the wavelength-converting element 203 which is the second-harmonic generating element, the blue laser light is canceled out so that the blue laser light is not emitted therefrom. Thereby, it is possible that the wavelength-converting element emits only the infrared laser light. Thereby, it is possible that only the infrared laser light and red laser light are incident on the CD, and the infrared laser light and red laser light, reflected by the CD are incident on the detector 233.) In this case, the intensity of the red laser light, which is not used for recording/reproducing, is modulated with a fixed frequency and a circuit which extracts only the tilt signal, for example is provided. In this case, the fixed frequency, with which the intensity of the red laser light, which is not used for recording/reproducing, is modulated, should be a frequency, which is out of the control band, that is, a frequency, to which the servo system does not respond, and, also, which is in a frequency band which has a small influence on increase in jitter in the reproduced signal. The above-mentioned circuit which extracts only the tilt signal may be such as that shown in FIG. 10. However, in this case, the signal (Pa+Pb), that is, the sum of the outputs of the light-receiving elements 233a and 233b, shown in FIGS. 26 and 27, is input to the signal-detecting amplifier A (15) and the signal (Pc+Pd), that is, the sum of the outputs of the light-receiving elements 233c and 233d, shown in FIGS. 26 and 27, is input to the signal-detecting amplifier B (16).

When recording/reproducing is performed on the S-DVD 216, the wavelength selecting filter 272 is used. Because the wavelength selecting filter 272 transmits the blue laser light and red laser light, the red laser light is used for the tilt detection while the blue laser light is used for recording/reproducing. In this case, the intensity of the red laser light, which is not used for recording/reproducing, is modulated with a fixed frequency and a circuit which extracts only the tilt signal, for example is provided. In this case, the fixed frequency, with which the intensity of the red laser light, which is not used for recording/reproducing, is modulated, should be a frequency, which is out of the control band, that is, a frequency, to which the servo system does not respond, and, also, which is in a frequency band which has a small influence on increase in jitter in the reproduced signal. The above-mentioned circuit which extracts only the tilt signal may be such as that shown in FIG. 10. However, in this case, the signal (Pa+Pb), that is, the sum of the outputs of the light-receiving elements 233a and 233b, shown in FIGS. 26 and 27, is input to the signal-detecting amplifier A (15) and the signal (Pc+Pd), that is, the sum of the outputs of the light-receiving elements 233c and 233d, shown in FIGS. 26 and 27, is input to the signal-detecting amplifier B (16).

When recording/reproducing is performed on the DVD 217, any one the wavelength selecting filters 271 and 272 is used. In a case where the wavelength selecting filter 271 is used, because the wavelength selecting filter 271 transmits the infrared laser light and red laser light, the infrared laser light is used for the tilt detection while the red laser light is used for recording/reproducing. (Instead of using the wavelength selecting filter 271, it is also possible that, as a result of the quasi phase matching being not performed in the wavelength-converting element 203 which is the second-harmonic generating element, the blue laser light is canceled out so that the blue laser light is not emitted therefrom. Thereby, it is possible that the wavelength-converting element emits only the infrared laser light. Thereby, it is possible that only the infrared laser light and red laser light are incident on the CD, and the infrared laser light and red laser light, reflected by the CD are incident on the detector 233.) In this case, the intensity of the infrared laser light, which is not used for recording/reproducing, is modulated by a fixed frequency and a circuit which extracts only the tilt signal, for example is provided. In this case, the fixed frequency, with which the intensity of the infrared laser light, which is not used for recording/reproducing, is modulated, should be a frequency, which is out of the control band, that is, a frequency, to which the servo system does not respond, and, also, which is in a frequency band which has a small influence on increase in jitter in the reproduced signal. The above-mentioned circuit which extracts only the tilt signal may be such as that shown in FIG. 10. However, in this case, the signal (Pa+Pb), that is, the sum of the outputs of the light-receiving elements 233a and 233b, shown in FIGS. 26 and 27, is input to the signal-detecting amplifier A (15) and the signal (Pc+Pd), that is, the sum of the outputs of the light-receiving elements 233c and 233d, shown in FIGS. 26 and 27, is input to the signal-detecting amplifier B (16). In a case where the wavelength selecting filter 272 is used, because the wavelength selecting filter 272 transmits the blue laser light and red laser light, the blue laser light is used for the tilt detection while the red laser light is used for recording/reproducing. In this case, the intensity of the blue laser light, which is not used for recording/reproducing, is modulated by a fixed frequency and a circuit which extracts only the tilt signal, for example is provided. In this case, the fixed frequency, with which the intensity of the blue laser light, which is not used for recording/reproducing, is modulated, should be a frequency, which is out of the control band, that is, a frequency, to which the servo system does not respond, and, also, which is in a frequency band which has a small influence on increase in jitter in the reproduced signal. The above-mentioned circuit which extracts only the tilt signal may be such as that shown in FIG. 10. However, in this case, the signal (Pa+Pb), that is, the sum of the outputs of the light-receiving elements 233a and 233b, shown in FIGS. 26 and 27, is input to the signal-detecting amplifier A (15) and the signal (Pc+Pd), that is, the sum of the outputs of the light-receiving elements 233a and 233b, shown in FIGS. 26 and 27, is input to the signal-detecting amplifier B (16).

In the above description of the tilt detection, the case where no optical-axis deviation (deviation of the light path developing between the ideal optical axis and the optical axis of the objective lens at the time of tracking) exists is described. Generally speaking, when there is the optical-axis deviation, the offset due to the optical-axis deviation develops, and, as a result, the error included in the tilt signal increases. In an arrangement in which the optical-axis deviation exists, as shown in FIG. 30, because it is not possible to determine whether the offset amount included in the tilt signal is one which develops due the tilt or one which develops due to the optical-axis deviation, a countermeasure such as to provide an optical-axis-deviation detecting member is necessary when the optical-axis deviation is large. However, in the case where the arrangement in which no optical-axis deviation exists is used, as shown in FIG. 31, as in the thirteenth embodiment, because the offset amount is determined only by the tilt, it is possible to perform the tilt detection accurately. As an optical system in which no optical-axis deviation exists, an optical system in which a method in which tracking is performed with the entire optical system is used can be used. When a relative tilt develops between an objective lens 252 and a substrate 251, as shown in FIG. 30, the position at which the laser light reflected by the substrate 251 is incident on a detector 253 changes from the position L0 to the position L1. However, in this case, also an optical-axis deviation develops in the objective lens 252 and the substrate 251. Thereby, the position at which the laser light reflected by the substrate 251 is incident on the detector 253 further changes from the position L1 to the position L1'. In contrast thereto, when only a relative tilt develops between the objective lens 252 and the substrate 251, as shown in FIG. 31, the position at which the laser light reflected by the substrate 251 is incident on a detector 253 changes only from the position L0 to the position L1.

Further, the present invention is not limited to the above-described embodiments, and variations and modifications may be made without departing from the scope of the present invention.

The present application is based on Japanese priority application Nos.10-245013 and 10-376158, filed on Aug. 31, 1998 and Dec. 21, 1998, respectively, the entire contents of which are hereby incorporated by reference.

What is claimed is:

1. An optical-pickup device, comprising:
a plurality of light sources;
an objective lens for converging light from said plurality of light sources on an optical disc; and
at least one light-receiving element for receiving light reflected by said optical disc,
wherein a light source of said plurality of light sources, which light source is not used for recording/reproducing, is used for detecting a relative tilt between said optical disc and said objective lens.

2. The optical-pickup device, as claimed in claim 1, wherein said optical-pickup device can perform recording/reproducing on any one of a plurality of types of optical discs, the thicknesses of substrates of said plurality of types of optical discs being different from each other.

3. The optical-pickup device, as claimed in claim 1, wherein:
said at least one light-receiving element comprises a plurality of light-receiving elements for said plurality of light sources, respectively; and
each light-receiving element is used for detecting an information signal and a servo signal based on the light reflected by said optical disc, and the same light-receiving element is also used for detecting a tilt signal based on the light reflected by said optical disc.

4. The optical-pickup device, as claimed in claim 1, wherein:
said at least one light-receiving element comprises a single light-receiving element for said plurality of light sources; and
said light-receiving element is used for detecting an information signal and a servo signal based on the light reflected by said optical disc, and the same light-receiving element is also used for detecting a tilt signal based on the light reflected by said optical disc.

5. An optical-pickup device, comprising:
an objective lens for converging light, emitted from a light source which is used for tilt detection, to an optical disc;
an actuator for said objective lens; and
a plurality of light-receiving elements for receiving the light reflected by said optical disc, for a plurality of light sources, respectively,
wherein each light-receiving element is used for detecting an information signal and a servo signal based on the light reflected by said optical disc, and the same light-receiving element is also used for detecting a tilt signal based on the light reflected by said optical disc.

6. An optical-pickup device, comprising:
an objective lens for converging light, emitted from a light source which is used for tilt detection, to an optical disc;
an actuator for said objective lens; and
further comprising a single light-receiving element for receiving the light reflected by said optical disc, for a plurality of light sources,
wherein said light-receiving element is used for detecting an information signal and a servo signal based on the light reflected by said optical disc, and the same light-receiving element is also used for detecting a tilt signal based on the light reflected by said optical disc.

7. A tilt-detecting method, comprising the steps of:
a) using any one of a plurality of light sources as a light source for detecting a relative tilt between an optical disc and an objective lens; and
b) causing, at a time of tilt detection, said light source to emit light obtained as a result of intensity modulation with a waveform including an alternating-current component, the basic frequency of said waveform being fixed.

8. The tilt-detecting method, as claimed in claim 7, wherein said waveform approximates a rectangular wave.

9. The tilt-detecting method, as claimed in claim 7, wherein said waveform is selected so that frequency components of said waveform are out of a control band so that a focusing-and-tracking servo system does not respond to said frequency components, and said frequency components include none or a few of the frequency components of a recording signal, have no or little influence on increase of jitter in a reproduced signal, or include none or a few of frequency components of various signals generated based on the information formed on said optical disc.

10. The tilt-detecting method, as claimed in claim 7, wherein a signal which includes no direct-current component is used for a tilt-detecting calculation.

11. The tilt-detecting method, as claimed in claim 7, wherein, at a beginning of the tilt detection, the level of the light emitted by the light source for the tilt detection is caused to rise in a manner in which the intensity of the emitted light increases gradually, and, also, the amplitude increases gradually so as to become a fixed amplitude, and, at an end of the tilt detection, the level of the laser light emitted by said light source for the tilt detection is caused to decay in a manner in which the intensity of the emitted light decreases gradually, and, also, the amplitude decreases gradually from the fixed amplitude.

12. The tilt-detecting method, as claimed in claim 7, wherein a tilt-detecting operation is performed intermittently.

13. The tilt-detecting method, as claimed in claim 7, wherein, in an operation mode in which a tilt-detecting operation cannot be performed, tilt correction is performed using tilt data which was detected in a tilt-detecting operation performed before the beginning of this operation mode.

14. The tilt-detecting method, as claimed in claim 7, wherein an offset of a focus-error signal or a tracking-error signal generated due to a tilt-detecting light at a time of tilt detection is removed based on detected tilt data.

15. The tilt-detecting method, as claimed in claim 14, wherein an S-shape tracking-error or focus-error signal is detected in a condition in which the light source for the tilt detection is in its turned-off state, then, the S-shape tracking-error or focus-error signal is detected in a condition in which the light source for the tilt detection is driven so that said light source emits the light obtained as a result of intensity modulation with said waveform, the difference (a–b) between the S-shape tracking-error or focus-error signals detected in these different conditions is calculated, the level 'c' of the mean direct-current signal of the tilt-detection signal is detected, said mean direct-current signal is inputted to a gain-adjustment circuit, the gain of which is set to be (a–b)/c, and the offset component of the focus-error or tracking-error signal is removed using the output of said gain-adjustment circuit, the output of which is caused to be equal to said difference (a–b).

16. An optical-pickup device which,can record information on any one of a plurality of types of optical recording media, the thicknesses of the substrates of said plurality of types of optical recording media being different from each other, and wavelengths used for performing recording/ reproducing on said plurality of types of optical recording media being different from each other, and can reproduce information recorded on said one of said plurality of types of optical recording media, said device comprising:

a semiconductor laser which emits laser light of a first wavelength;

a wavelength-converting element which produces laser light of a second wavelength which is half of said first wavelength;

a converging optical system which can focus the laser light of wavelength on the information recording plane of said one of said plurality of types of optical recording media, said wavelength being one of said first and second wavelengths corresponding to said one of said plurality of types of optical recording media;

a light-path splitting element which splits the light path of the laser light of said first wavelength and the laser light of said second wavelength into separate light paths for the respective first and second wavelengths;

a first detector which detects the reflected laser light of said first wavelength; and a second detector which detects the reflected laser light of said second wavelength, wherein either one of the laser light of said first wavelength and the laser light of said second wavelength is used for performing recording/reproducing of information on said one of said plurality of types of optical recording media, and, also, the other one is used for tilt detection for detecting the relative tilt between the information recording plane of said one of said plurality of types of optical recording media and an objective lens of said converging optical system.

17. The optical-pickup device, as claimed in claim 16, wherein said light-path splitting element is provided in front of each of said first and second detectors.

18. The optical-pickup device, as claimed in claim 16, wherein:

said converging optical system comprises a first objective lens for focusing the laser light of said first wavelength on the corresponding one of said plurality of types of optical recording media and a second objective lens for focusing the laser light of said second wavelength on the corresponding one of said plurality of types of optical recording media;

one of said first and second objective lenses is selected to be used for performing recording/reproducing of information on one of said plurality of types of optical recording media, said one of said plurality of types of optical recording media being one on which recording/ reproducing of information is currently performed, said one of said first and second objective lenses being one corresponding to said one of said plurality of types of optical recording media; and said one of said first and second objective lens is inserted into the light path of the laser light.

19. The optical-pickup device, as claimed in claim 16, wherein:

said converging optical system comprises the objective lens for focusing the laser light of said second wavelength on the corresponding one of said plurality of types of optical recording media and a numerical-aperture limiting aperture for limiting the numerical aperture of said objective lens for the laser light of said first wavelength so as to focus said laser light of said first wavelength on the corresponding one of said plurality of types of optical recording media; and said numerical-aperture limiting aperture is provided in the light path of the laser light in front of said objective lens.

20. The optical-pickup device, as claimed in claim 16, wherein said light-path splitting element comprises a dichroic mirror.

21. The optical-pickup device, as claimed in claim 16, said light-path splitting element comprises a wavelength selecting hologram.

22. An optical-pickup device which can record information on any one of a plurality of types of optical recording media, the thicknesses of the substrates of said plurality of types of optical recording media being different from each other, and wavelengths used for performing recording/ reproducing on said plurality of types of optical recording media being different from each other, and can reproduce information recorded on said one of said plurality of types of optical recording media, said device comprising:

a first semiconductor laser which emits laser light of a first wavelength;

a wavelength-converting element which produces laser light of a second wavelength which is half of said first wavelength;

a second semiconductor laser which emits laser light of a third wavelength which is different from said first wavelength and also is different from said second wavelength;

a light-path synthesis element which causes the light path of the laser light of said third wavelength to become the same as the light path of the laser light of said first wavelength and the laser light of said second laser light;

a converging optical system which can focus the laser light of the wavelength on an information recording plane of said one of said plurality of types of optical recording media, said wavelength being one of said first, second and third wavelengths corresponding to said one of said plurality of types of optical recording media;

a detector which can detect at least any of the reflected laser light of said first wavelength, the reflected laser light of said second wavelength and the reflected laser light of said third wavelength, wherein any one of the laser light of said first wavelength, the laser light of said second wavelength and the laser light of said third wavelength is used for performing recording/reproducing of information on said one of said plurality of types of optical recording media, and, also, at least one of the other two of the laser light of said first wavelength, the laser light of said second wavelength and the laser light of said third wavelength is used for tilt detection for detecting a relative tilt between the information recording plane of said one of said plurality of types of optical recording media and an objective lens of said converging optical system.

23. The optical-pickup device, as claimed in claim 22, further comprising at least two wavelength-selecting elements which selectively transmit a first combination of two of the laser light of said first wavelength, the laser light of said second wavelength and the laser light of said third wavelength and a second combination of two of the laser light of said first wavelength, the laser light of said second wavelength and the laser light of said third wavelength, respectively.

24. The optical-pickup device, as claimed in claim 22, wherein:

said converging optical system comprises a first objective lens for focusing the laser light of said first wavelength on the corresponding one of said plurality of types of optical recording media, a second objective lens for focusing the laser light of said second wavelength on the corresponding one of said plurality of types of optical recording media and a third objective lens for focusing the laser light of said third wavelength on the corresponding one of said plurality of types of optical recording media;

one of said first, second and third objective lenses is selected to be used for performing recording/reproducing of information on one of said plurality of types of optical recording media, said one of said plurality of types of optical recording media being one on which recording/reproducing of information is currently performed, said one of said first, second and third objective lens being one corresponding to said one of said plurality of types of optical recording media; and said one of said first, second and third objective lens is inserted into the light path of the laser light.

25. The optical-pickup device, as claimed in claim 22 wherein:

said converging optical system comprises the objective lens for focusing the laser light of said second wavelength on the corresponding one of said plurality of types of optical recording media and a numerical-aperture limiting aperture for limiting the numerical aperture of said objective lens for the laser light of said first wavelength and the laser light of said third wavelength so as to focus said laser light of said first wavelength on the corresponding one of said plurality of types of optical recording media and focus said laser light of said third wavelength on the corresponding one of said plurality of types of optical recording media; and said numerical-aperture limiting aperture is provided in the light path of the laser light in front of said objective lens.

26. The optical-pickup device, as claimed in claim 22, wherein, when recording/reproducing is performed on one of said plurality of types of optical recording media, said one of said plurality of types of optical recording media being one corresponding to the laser light of said first wavelength, said wavelength-converting element does not cause the phases of the components of the laser light of said second wavelength to match with each other, so that said wavelength-converting element does not emit the laser light of said second wavelength.

27. An optical-pickup device which can record information on any one of a plurality of types of optical recording media, the thicknesses of the substrates of said plurality of types of optical recording media being different from each other, and wavelengths used for performing recording/reproducing on said plurality of types of optical recording media being different from each other, and can reproduce information recorded on said one of said plurality of types of optical recording media, said device comprising:

a first semiconductor laser which emits laser light of a first wavelength;

a wavelength-converting element which produces laser light of a second wavelength which is half of said first wavelength;

a second semiconductor laser which emits laser light of a third wavelength which is different from said first wavelength and also is different from said second wavelength;

a light-path synthesis element which causes the light path of the laser light of said third wavelength to become the same as the light path of the laser light of said first wavelength and the laser light of said second wavelength;

a converging optical system which can focus the laser light of the wavelength on an information recording plane of said one of said plurality of types of optical recording media, said wavelength being one of said first and second wavelengths corresponding to said one of said plurality of types of optical recording media;

a light-path splitting element which splits the light path of the laser light of said first wavelength, the laser light of said second wavelength and the laser light of said third wavelength into separate light paths for the respective first, second and third wavelengths;

a first detector which detects the reflected laser light of said first wavelength;

a second detector which detects the reflected laser light of said second wavelength; and a third detector which detects the reflected laser light of said third wavelength, wherein any one of the laser light of said first wavelength, the laser light of said second wavelength and the laser light of said third wavelength is used for performing recording/reproducing of information on said one of said plurality of types of optical recording media, and, also, at least one of the other two of the laser light of said first wavelength, the laser light of said second wavelength and the laser light of said third wavelength is used for tilt detection for detecting a relative tilt between the information recording plane of said one of said plurality of types of optical recording media and an objective lens of said converging optical system.

28. The optical-pickup device, as claimed in claim 27, wherein said light-path splitting element is provided in front of each of said first, second and third detectors.

29. The optical-pickup device, as claimed in claim 22, wherein:

said converging optical system comprises a first objective lens for focusing the laser light of said first wavelength on the corresponding one of said plurality of types of optical recording media, a second objective lens for focusing the laser light of said second wavelength on the corresponding one of said plurality of types of optical recording media and a third objective lens for focusing the laser light of said third wavelength on the corresponding one of said plurality of types of optical recording media;

one of said first, second and third objective lenses is selected to be used for performing recording/reproducing of information on one of said plurality of types of optical recording media, said one of said plurality of types of optical recording media being one on which recording/reproducing of information is currently performed, said one of said first, second and third objective lens being one corresponding to said one of said plurality of types of optical recording media; and said one of said first, second and third objective lens is inserted into the light path of the laser light.

30. The optical-pickup device, as claimed in claim 27, wherein:

said converging optical system comprises the objective lens for focusing the laser light of said second wavelength on the corresponding one of said plurality of types of optical recording media and a numerical-aperture limiting aperture for limiting the numerical aperture of said objective lens for the laser light of said first wavelength and the laser light of said third wavelength so as to focus said laser light of said first wavelength on the corresponding one of said plurality of types of optical recording media and focus said laser light of said third wavelength on the corresponding one of said plurality of types of optical recording media; and said numerical-aperture limiting aperture is provided in the light path of the laser light in front of said objective lens.

31. The optical-pickup device, as claimed in claim 27, wherein, when recording/reproducing is performed on one of said plurality of types of optical recording media, said one of said plurality of types of optical recording media being one corresponding to the laser light of said first wavelength, said wavelength-converting element does not cause the phases of the components of the laser light of said second wavelength to match with each other, so that said wavelength-converting element does not emit the laser light of said second wavelength.

32. The optical-pickup device, as claimed in claim 27, wherein said light-path splitting element comprises dichroic mirrors.

33. The optical-pickup device, as claimed in claim 27, wherein said light-path splitting element comprises a wavelength selecting hologram.

* * * * *